(12) United States Patent
Christy et al.

(10) Patent No.: US 11,633,881 B1
(45) Date of Patent: Apr. 25, 2023

(54) HEATED COMPOSITE TOOL AND METHOD FOR BUILDING AND USE

(71) Applicant: GENERAL NANO LLC, Cincinnati, OH (US)

(72) Inventors: Larry Allen Christy, Cincinnati, OH (US); Joseph E. Sprengard, Cincinnati, OH (US); Thomas J. Sorenson, Cottonwood Heights, UT (US); Chaminda Jayasinghe, Cincinnati, OH (US)

(73) Assignee: General Nano LLC, Cincinnati, OH (US)

( * ) Notice: Subject to any disclaimer, the term of this patent is extended or adjusted under 35 U.S.C. 154(b) by 319 days.

(21) Appl. No.: 16/720,612

(22) Filed: Dec. 19, 2019

Related U.S. Application Data

(60) Provisional application No. 62/782,791, filed on Dec. 20, 2018.

(51) Int. Cl.
  *B29C 35/02* (2006.01)
  *B29C 65/00* (2006.01)
  (Continued)

(52) U.S. Cl.
  CPC .......... *B29C 35/02* (2013.01); *B29C 33/3807* (2013.01); *B29C 33/3828* (2013.01);
  (Continued)

(58) Field of Classification Search
  CPC ..... B29C 35/02; B29C 66/72; B29C 33/3828; B29C 33/3807; B29K 2105/0872; B29K 2105/167
  See application file for complete search history.

(56) References Cited

U.S. PATENT DOCUMENTS

| | | | |
|---|---|---|---|
| 5,616,666 A | * | 4/1997 | Morton .................... C08J 5/249 548/423 |
| 6,143,215 A | | 11/2000 | McCollum et al. |
| | | (Continued) | |

FOREIGN PATENT DOCUMENTS

| | | |
|---|---|---|
| WO | 2016019143 | 2/2016 |
| WO | 2016126827 | 8/2016 |
| WO | 2017136806 | 8/2017 |

OTHER PUBLICATIONS

First Office Action dated Feb. 18, 2022 for related U.S. Appl. No. 16/323,001, filed Feb. 4, 2019 (16 pages).

*Primary Examiner* — Jeffrey M Wollschlager
(74) *Attorney, Agent, or Firm* — Daniel F. Nesbitt; Nesbitt IP LLC

(57) ABSTRACT

A heated composite tool, useful for forming, debulking, and/or curing prepreg materials, including a composite build structure having a shape of a composite part that is to be produced, configured to receive and support prepreg materials during lay-up, and including a heating structure physically coupled to the composite build structure, and comprising at least one heating element, including a carbon nanotube structured layer defining a current path having first and second ends and first and second electrical terminals electrically coupled to the first and second ends and a first isolation ply disposed between the composite build structure and the at least one heating element, the first isolation ply forming an electrical insulating gap between the at least one heating element and the composite build structure, wherein the carbon nanotube structured layer is responsive to an electromotive force applied across the first and second electrical terminals to heat the tool.

12 Claims, 12 Drawing Sheets

(51) Int. Cl.
  *B29C 33/38* (2006.01)
  *B29K 105/16* (2006.01)
  *B29K 105/08* (2006.01)

(52) U.S. Cl.
  CPC ...... *B29C 66/72* (2013.01); *B29K 2105/0872* (2013.01); *B29K 2105/167* (2013.01)

(56) References Cited

U.S. PATENT DOCUMENTS

| | | | |
|---|---|---|---|
| 6,257,867 B1 | 7/2001 | McCollum et al. | |
| 6,287,493 B1 | 9/2001 | McCollum et al. | |
| 6,623,672 B2 | 9/2003 | McCollum et al. | |
| 7,306,692 B2 | 12/2007 | Graham | |
| 7,497,981 B2 | 3/2009 | Graham | |
| 8,002,926 B2 | 8/2011 | Graham | |
| 8,251,691 B2 | 8/2012 | Graham et al. | |
| 8,580,176 B2 | 11/2013 | Graham | |
| 8,741,092 B2 | 6/2014 | Graham | |
| 9,107,292 B2 | 8/2015 | Shah et al. | |
| 9,180,979 B2 * | 11/2015 | Hallander | B29C 45/73 |
| 9,902,091 B2 * | 2/2018 | Metaverso | B29C 33/3807 |
| 10,652,957 B2 * | 5/2020 | Kim | F24C 7/04 |
| 11,122,649 B2 * | 9/2021 | Linde | H05B 3/267 |
| 2004/0145094 A1 | 7/2004 | McCollum et al. | |
| 2004/0145095 A1 | 7/2004 | McCollum et al. | |
| 2006/0052509 A1 | 3/2006 | Saitoh | |
| 2007/0134480 A1 * | 6/2007 | Buyny | C08J 5/243 |
| | | | 428/292.1 |
| 2008/0110575 A1 | 5/2008 | Graham | |
| 2008/0203622 A1 | 8/2008 | Graham | |
| 2008/0211145 A1 | 9/2008 | Graham | |
| 2008/0241302 A1 | 10/2008 | Graham et al. | |
| 2009/0104361 A1 | 4/2009 | Ma et al. | |
| 2009/0215961 A1 * | 8/2009 | Bongiovanni | C08L 79/085 |
| | | | 525/132 |
| 2009/0294053 A1 | 12/2009 | Graham | |
| 2010/0051182 A1 | 3/2010 | Graham | |
| 2010/0122980 A1 * | 5/2010 | Wang | H05B 3/145 |
| | | | 219/553 |
| 2011/0204541 A1 | 8/2011 | Graham | |
| 2011/0254189 A1 | 10/2011 | Doyle et al. | |
| 2012/0135219 A1 | 5/2012 | Graham | |
| 2012/0280430 A1 | 11/2012 | Jones | |
| 2013/0240110 A1 * | 9/2013 | Hallander | B29C 33/40 |
| | | | 156/60 |
| 2013/0306220 A1 | 11/2013 | Graham | |
| 2015/0321908 A1 | 11/2015 | Wagner et al. | |
| 2016/0311133 A1 * | 10/2016 | Metaverso | C08K 13/04 |
| 2016/0374147 A1 * | 12/2016 | Song | H05B 3/10 |
| 2017/0210627 A1 | 7/2017 | Jayasinghe et al. | |
| 2017/0332443 A1 * | 11/2017 | Linde | H05B 6/46 |
| 2019/0037645 A1 * | 1/2019 | Kim | H05B 3/141 |

\* cited by examiner

HEATED COMPOSITE TOOL AND METHOD FOR BUILDING AND USE

CROSS-REFERENCE TO RELATED APPLICATION

The present application claims the benefit of U.S. Provisional Application Ser. No. 62/782,791 filed Dec. 20, 2018, the disclosure of which is incorporated herein by reference in its entirety.

TECHNICAL FIELD

The present disclosure is related to tools for manufacturing composite component parts from laminated prepregs.

BACKGROUND

Aerospace vehicles, e.g., airplanes, helicopters, spacecraft, missiles, and the like, are being designed and manufactured with greater percentages of composite materials. The use of composites may increase the strength, decrease the weight, provide improved functional performance properties, are often quicker to manufacture with reduced number of parts, and provide a longer service life of various components of the aerospace vehicle. For example, and in airplanes, composite materials can be used in the construction of a variety of component parts including wings, fuselages, winglets, slats, spoilers, ailerons, flaps, horizontal and vertical stabilizers, rudders, etc., and some of these component parts have become quite large over time. Similarly, composite materials can be used in the construction of rotor blades, stabilizers bars, tail booms, and elevators in helicopters, just to provide some additional examples.

Many of these parts also have complex shapes or compound curves and/or sharp edges that are designed to allow these vehicles to move through the air more efficiently or in a particular manner. For example, military aircraft commonly employ stealth technology whereby these aircraft are designed to avoid detection using a variety of technologies that reduce reflection and/or emission of radar, infrared, visible light, radio frequency and audio, giving rise to even more unique shapes with even more pronounced or sharp edges.

Composite materials are engineered materials made from two or more constituent materials, each with significantly different physical and/or chemical properties, which remain separate and distinct within the finished product but which cooperate to form a material with enhanced physical properties. Composite materials, i.e., fiber reinforced composites, can consist of various types of fibers, including carbon fiber, aramid (e.g., Kevlar®), fiberglass, glass, graphene, carbon nanotube, silicon carbide, polyester, etc., held together in a resin. The resin can be epoxy, bismaleimide (BMI), acrylonitrile butadiene styrene (ABS), acetal, acrylic, cellulose acetate butyrate (CAB), chlorinated polyvinyl chloride (CPVC), ethylene chlorotrifluoroethylene (ECTFE), Fluorosint, polyamide (nylon), polyether ether ketone (PEEK), polyethylene terephthalate (PET), polycarbonate, polypropylene, polysulfone, polyphenylene (PPS), polyvinyl chloride (PVC), polyvinyl alcohol (PVA), polyvinylidene fluoride or polyvinylidene difluoride (PVDF), polytetrafluoroethylene (PTFE), Tecator, styrene acrylic, phenoxy, polyurethane, or ultrahigh molecular weight polyethylene (UHMPE or UHMW), to name some examples.

Further, one type of uncured fiber reinforced composite material is often referred to as a "prepreg." For example, prepreg is the term commonly applied to a carbon fiber fabric that has been pre-impregnated with a resin, typically epoxy, that already includes the proper curing agent and is ready to be laid into or on a mold.

To construct or build these exemplary parts, prepreg materials are used with molds, or as they are many times referred to as "tools," and typically go through multiple debulking processes and a curing process. The tools are typically disposed on the windswept or windward side of the part, which is to say, the first layer of material placed into the tool typically goes, for example, to the outside of the aircraft whereas subsequent layers are more inboard or interior to the aircraft. This is done to provide the smoothest exterior surface for airflow. Many layers of prepreg material are often laminated together to provide the requisite strength and load carrying capability.

When two or more layers of prepreg material are placed into or on a tool, air can become trapped between the layers. Oftentimes, trapped air or gas cannot be seen and, if not removed or forced out, results in voids or air or gas in pockets in the resulting laminate, which can compromise the structural integrity and/or reduces the strength of a part and can lead to part failure. With aerospace vehicles, part failures can be catastrophic in nature and, many times, fatal. Further, as successive layers are added, there is a greater opportunity for trapped air or gas and the laminate becomes less "consolidated," and "bulky." A laminate that is less consolidated or unevenly consolidated, i.e., non-homogenous, is also not as strong and can likewise fail with similar consequences.

"Debulking" is the process that removes air or gas from the laminate, and that ensures even consolidation of the material before final curing of the resin. Debulking processes can use heat alone or a combination of heat and pressure. When parts require many layers of prepreg material to provide the requisite strength and load carrying capability, debulking is typically performed every five to ten layers, depending on the complexity and/or shape of the part, these debulked five to ten layers portions of a part referred to hereinafter as "subpart."

In a non-limiting example, a tool receives a number of layers of prepreg material to construct a part or subpart. A flexible, air impermeable film or sheet is then placed over the laminate material and sealed against the tool, around the periphery of the part or subpart, forming a container that defines a space, with a sealable opening. A vacuum is then applied to the sealed space of the container to evacuate air or gas within the space, to allow the atmospheric pressure outside the container to push or press the layers of prepreg material together to force out trapped air or gas from between the layers of the laminated material. The tool is then placed in an oven or autoclave to warm and soften the resin and further consolidate the laminate. At some stage, the laminated prepregs of the part or subpart are warmed, e.g., to 100-200 degrees Fahrenheit (° F.) (38-93 degrees Celsius (° C.)), sufficient to debulk the prepreg material. Preferably during debulk, the prepregs are heated to a temperature that does not cure the resin. Again, depending on the part program, i.e., the number, type and order of layers in the part design, this can be required every five to ten plies depending on the complexity and/or shape of the part.

There are several disadvantages to this debulking process. For one, aerospace component parts of this nature are typically built in clean facilities or cleanrooms, because foreign object debris (FOD) can compromise the structural integrity and/or strength of parts. Thus, prepreg laminates are often placed or laid up onto a tool in a clean environment, e.g., the cleanroom, and then the tool is moved to an oven or autoclave to warm the resin for debulking. This process must be repeated, sometimes over and over again, when parts require many layers and/or are complex. Ultimately, a full assembled and debulked part is place back into the autoclave for curing. This is sometimes referred to as "conventional autoclave-based manufacturing," and is time consuming and expensive, having to move the tools with the laid-up laminates or subparts between the clean facilities and the autoclaves, and allows additional opportunities for the entry of foreign objects.

Further, as the size of the parts increase, this process either becomes even more costly and time consuming or, at some point, becomes completely impractical. Large ovens sufficient to heat large component parts are expensive to own and operate and take time to come up to warming temperature, and cool, when opened and closed repeatedly. Parts and the associated tools used to build them can even become so large that it becomes infeasible to move them at all; for example, a wing of a large passenger airplane. The tool used for such an airplane wing is also very expensive and complex, and there is a risk of damage to the tool if it were to be moved.

In another non-limiting example, and keeping with large parts, a tool with a number of layers of prepreg material can be enclosed in a bag or "bagged" and a vacuum applied to the bag to evacuate air or gas from within the bag, to allow the atmospheric pressure outside the bag to push or press the layers of prepreg material together to force out trapped air or gas from between the layers of the laminated material. Similarly, the prepreg materials are preferably heated during debulk while bagged.

In yet another non-limiting example, and again with larger parts, sections of the part can be worked on sequentially, moving, or traversing across the non-windswept side of the part. This helps to facilitate heating of the part, as it is generally impractical to heat the entire surface of such a large part all at once.

With larger parts, heat blankets are typically used to provide the necessary heat for debulking; but some of these too have disadvantages. For example, filamentary heat blankets, due to their construction, are rather stiff and not particularly flexible. As a result, these heat blankets work well enough on a tool or part which is relatively flat or planar, such as an airplane wing, but become less and less satisfactory as the shape of the part to be laminated becomes more complex, incorporating, for example, reentrant portions, recesses, or tight-radius inside contours. Further, since the filamentary wires within these blankets have to be precision placed, these blankets are not easily scaled to larger parts, and become quite expensive too as they become larger. This is sometimes referred to as "out-of-autoclave" production or manufacturing. As a result, the aerospace industry has, in part, turned to the notion of heated tools as will be discussed in more detail hereinafter.

The tools used for forming the prepreg materials into the parts can be made from a variety of materials. For parts cured at ambient or low temperature, or for prototyping, where tight control of dimensional accuracy is not required or critical, materials such as fiberglass, high-density foams, machinable epoxy boards, or even clay or wood/plaster models can be used. However, tool complexity and cost increases rapidly with part performance requirements, and with the number of parts to be produced. High-rate production tools are generally made of robust metals that can tolerate or stand up to repeated cycles, while maintaining good surface finish and dimensional accuracy. The tools with which high-performance composite parts are formed can be made from carbon fiber/epoxy, monolithic graphite, castable graphite, ceramics or metals, which are typically aluminum or steel, each material offering unique capabilities and drawbacks.

Sometimes referred to as "hard tooling," ceramic and metal tools, although relatively heavy and expensive, are able to withstand many thousands of production cycles. The most durable tools, but also the most expensive, are made of special steel alloys, i.e., an alloy of iron and nickel, such as Invar™, known generically as FeNi36 (64FeNi in the United States). For example, many tools used in the aerospace industry are made with Invar®.

Composite tools, sometimes referred to as "soft tooling," are more readily constructed and, because they are made from materials similar to those used by composite manufacturers, they can often be made in-house. But as the moniker suggests, soft tools wear more readily and thus, are typically found in low-volume production. However, several tools can be made with composite materials for less than the cost of a single hard tool making larger volumes somewhat affordable.

Parts made on hard tooling are typically cured in an oven or autoclave. However, when the parts become large, for example, an airplane wing; they can be cured "out-of-autoclave," or by using heating that is sometimes included with and/or integrated into the tool itself, such as forced air or fluid, e.g., hot water, heating. Tooling with built-in ducts that heat and cool using forced air have been used in the aerospace industry for decades. Also, the wind industry has infused lay-ups in heated molds for years, commonly using fluid conduits. Using heated and cooled liquids for molding composites may have begun with VEC Technology, Inc. of Greenville, Pa., see for examples; U.S. Pat. Nos. 6,143,215, 6,257,867, 6,287,493, and 6,623,672, and U.S. Patent Publication Numbers 2004/0145095 and 2004/0145094, the disclosures of which are incorporated herein by reference in their entireties; and later with Quickstep Technologies Pty Ltd. of Applecross, Australia, see for examples, U.S. Pat. Nos. 7,306,692, 7,497,981, 8,002,926, 8,251,691, 8,580, 176, and 8,741,092, and U.S. Patent Publication Numbers 2008/0110575, 2008/0203622, 2008/0211145, 2008/0241302, 2009/0294053, 2010/0051182, 2011/0204541, 2012/0135219, and 2013/0306220, the disclosures of which are also incorporated herein by reference in their entireties. Other systems include a self-heated tool available from Techni Modul Engineering of Coudes, France that features a fluid circulation system for oil, water or metal-based fluids. Although floating mold processing as resin transfer molding (RTM), and a process adaptable to liquid resin infusion, resin film infusion or light RTM, together with a fluid circulation system, use a variety of fluids to impart temperature control and each describes its composite tooling shells as thin, lightweight and less costly than the traditional metal tools, such heating systems are not particularly desirable as they are generally large, cumbersome, complex, and expensive.

Parts made on composite tools can likewise be cured in an autoclave, or by integral heating, in which case the heating elements are actually placed inside or incorporated into the tool itself. For example, one product that can be used to construct a composite tool is HexTool® from Hexcel headquartered in Stamford, Conn., a machinable carbon fiber/bismaleimide (BMI) composite tooling material. HexTool® comprises prepreg strips that are randomly distributed onto a release paper to form a larger mat. After lay-up and cure, HexTool® can be machined like metal, has a coefficient of thermal expansion that matches carbon/epoxy parts, and can survive approximately 500 autoclave cycles. This, points to an important consideration in the production of precision aerospace parts, for example.

A fundamental issue with tooling for composite parts is the phenomenon of coefficient of thermal expansion (CTE) mismatch. Here, composite tooling has a distinct advantage. Composite tools made from tooling prepregs have a CTE close to the part CTE, helping the part maintain dimensional accuracy during cure. Shrinkage and thermal expansion of the tool and part is generally very similar. Comparatively, the CTE of most metal tool materials and composites are mismatched. For instance, unalloyed low carbon mild steel, sometimes specified as C-20, and aluminum are common tool materials choices due to low cost and short lead times for delivery compared to high-performance special alloys. However, during heated cure, the CTE mismatch between the cheaper metal tool materials and the composite parts being produced is often too extreme to realize or build high-tolerance parts. Only higher-priced metal alloys, such as Invar®, offer close CTE matching. For example; only Invar® offers a CTE that is close to that of carbon fiber composites. For that reason, Invar® has been the perennial choice for carbon composite parts that must be manufactured to extremely tight tolerances, such as aerospace parts. Unfortunately, Invar® is generally the most expensive metallic tooling material and, for large parts in particular, the sheer size and weight of the tools makes the tools difficult to move and handle, as well as risky, for fear of brakeage or damage to the tool in movement, as previously mentioned. Thus, many aerospace industry manufacturers, in particular, have a desire for carbon fiber tooling materials that can withstand thousands of autoclave cure cycles, much like Invar®, yet offer reduced weight and cost.

To increase the durability of composite tooling, several suppliers now offer hybrid tool designs that combine, for example, a thin Invar® part surface or "facesheet" with a composite support structure, or a carbon foam core with a composite facesheet.

Other technologies have also evolved to rival or compete with the durability of Invar®, but at a fraction of its weight and cost. For example, Janicki Industries of Sedro-Woolley, Wash. has produced a void-free, 300-ply BMI laminate using resin infusion. This facilitates the production of billets of BMI carbon composite that can be CNC-machined into precision tooling which is cheaper and approximately 80 percent less dense than Invar®. These billets can be used for aerospace rib, spar, and stringer tools, where the parts will be a combination of autoclave-cured high-temperature epoxy and carbon fiber. The use of BMI greatly extends the service life of the tool compared to epoxy, which cannot, for example, withstand cycling up to 177° C. (350° F.) over an extended period of time. Some other BMI technologies that also provide longer tool life include: Fortified Tooling Prepreg (FTP) BMI from the Advanced Materials Division of 3M of St. Paul, Minn. and the Beta Prepreg tooling system using Henkel benzoxazine resin from Airtech International, Inc. of Huntington Beach, Calif. Both of these can be autoclave-cured and offer lower resin shrinkage over epoxy with excellent machinability. Further, 3M BMI TC-44 Si distributed by TenCate Advanced Composites of Nijverdal, The Netherlands and Morgan Hill, Calif. uses a 40 percent by weight loading of microscopic silica particles to reduce through-thickness CTE by 15 percent linear CTE by 40 percent and linear cure shrinkage by 50 percent compared to comparable non-filled autoclave-cured BMI prepreg. Together, these improvements reduce thermal stresses, part distortion, and can generally be expected to reduce the tendency of a material to deviate from the tool shape due to cure shrinkage in the composite, i.e., "springback." Other benefits include better scratch resistance, fracture toughness, reduced microcracking, and 40 percent lower exotherm per mass for much improved thermal management, especially important for thick part fabrication. Airtech reports similar performance and production benefits for its Beta Prepreg, which uses the chemistry of benzoxazine instead of nano-silica, and demonstrates a 70 percent improvement in springback.

Another alternative to traditional Invar® tooling or Invar® faced tooling is a toolmaking process that uses nickel vapor deposition (NVD). This process produces a relatively thin nickel-shell tool face that is mounted on a backing structure. The nickel tool surface can achieve high dimensional accuracy, and offers low CTE, long life and, because it is far less bulky than machined metal tools, weighs less and facilitates faster tool heating and cooling. For example, Weber Manufacturing Technologies of Midland, Ontario, Canada produces nickel-shell tools for applications ranging from automotive body panels to aircraft parts.

The advent of composite tooling, and the need for heating, has allowed filamentary wiring to be integrated into the tool. For example, EireComposites Teoranta of Galway, Ireland has applied for a patent on building integrally heated tools with embedded electrical heating elements using an aluminosilicate-type ceramic cement, which offers low CTE, density, thermal mass, and electrical conductivity, as more fully described in U.S. Patent Publication 2011/0254189, the disclosure of which is incorporated herein in its entirety. As disclosed, carbon fiber reinforcement bolsters the low tensile strength of the ceramic using polyetheretherketone (PEEK) high-performance thermoplastic polymer as an adhesive between the carbon fiber and the ceramic. The tooling can be built on inexpensive patterns because the ceramic becomes rigid at 60° C. (140° F.). The tooling is removed from the pattern after this initial lower-temperature cure and then processed to full temperature, i.e., 200° C. to 400° C. (392° F. to 752° F.), via a freestanding post-cure. The in-plane CIE measured for a tool at least 15 millimeters (mm) or 0.6 inches thick is less than $5.0 \times 10^{-6}/°$ C., and is generally accepted as a "matching value" for most glass and carbon fiber composites. Using an electrical wattage density of 10 kilowatts per square meter (KW/ml, this type of tool surface can be brought to 200° C. in less than 10 minutes.

Considering the advancements in materials used to construct these tools, and in many instances size and associated cost, all tools still generally suffer difficulty to some degree as described hereinabove in heating for debulk and cure in producing parts. Accordingly, those skilled in the art continue with research and development efforts in the field of tools for use with composite materials.

SUMMARY

The present invention provides a heated composite tool useful for forming, debulking, and/or curing prepreg materials, comprising a composite build structure having a shape of a composite part that is to be produced, configured to receive and support the prepreg materials during lay-up, and comprising a base structure, a heating structure physically coupled to the base structure, and including at least one heating element, comprising a carbon nanotube structured layer defining a current path having a first end and a second end, and a first electrical terminal electrically coupled to the first end and a second electrical terminal electrically coupled to the second end, and a first isolation ply disposed between the base structure and the at least one heating element, the first isolation ply forming an electrical insulating gap between the base structure and the at least one heating element, wherein the carbon nanotube structured layer is responsive to an electromotive force applied across the first and the second electrical terminals to heat the tool.

In one embodiment, the base structure comprises at least one of carbon fiber including a resin and a curing agent, a carbon foam core and one or more carbon fiber laminates including a resin and a curing agent, and a machined carbon fiber/bismaleimide (BMI) composite tooling material including a resin and a curing agent.

In another embodiment, the heated composite tool further comprises a framework coupled to the base structure and configure to further support the composite build structure and the prepreg materials during lay-up.

In another embodiment, the composite build structure further comprises a facesheet having an upper surface and a lower surface, the upper surface configured to receive the prepreg materials, the carbon nanotube structured layer having a top surface, the composite build structure further comprising a second isolation ply, the second isolation ply forming an electrical insulating gap between the top surface of the carbon nanotube structured layer and the lower surface of the facesheet.

In another embodiment, the facesheet follows the shape of the composite part that is to be produced, the first and second isolation plies are pre-impregnated with a resin, the resin including a curing agent, and the first and second isolation plies are cured so that the heating structure also follows and maintains the shape of the composite part that is to be produced.

In another embodiment, the carbon nanotube structured layer is pre-impregnated with a resin including a curing agent, and the resistivity of the at least one heating element is in the range of 0.25-100 ohms per square ($\Omega/\square$) prior to curing and in the range of 0.75-300 ohms per square ($\Omega/\square$) after curing.

In another embodiment, at least one of the first isolation ply and the second isolation ply comprises fiberglass.

In another embodiment, the resistivity of the at least one heating element is in the range of 0.75-300 ohms per square ($\Omega/\square$).

In another embodiment, the facesheet comprises at least one of Invar®, a carbon fiber surfacing ply including a resin and a curing agent, and nickel deposited using nickel vapor deposition (NVD).

In another embodiment, the heated structure further comprises a plurality of heating elements, each heating element defining a different heat zone across the composite build structure.

In another embodiment, the carbon nanotube structured layer and the base structure have corresponding holes, at least one of the first and the second electrical terminals comprises at least one electrode having a corresponding hole to the corresponding holes in the carbon nanotube structured layer and the base structure, and the electrode is in electrical contact with and placed against the carbon nanotube structured layer. A threaded fastener having a head and a threaded shaft, is inserted and passes through the corresponding holes in the at least one electrode, the carbon nanotube structured layer, and the base structure. An insulating washer sized to the threaded fastener and placed over the threaded shaft of the threaded fastener and against the base structure, the insulating washer preventing the threaded fastener from making electrical contact with the base structure, and a nut sized to the threaded fastener is placed on the threaded shaft of the threaded fastener, and tightened against the insulating washer, the threaded fastener and the nut sandwiching the at least one electrode and the carbon nanotube structured layer together. The threaded fastener extends the current path.

In another embodiment, the threaded fastener and the nut comprises at least one of Invar® and titanium and has a coefficient of thermal expansion similar to that of carbon fiber.

In another embodiment, the response to an applied electromotive force results in a power density of 0.5-30 watts per square inch (0.08-4.7 watts per square centimeter) on a surface of the tool.

In another embodiment, the heat of the tool can be adjusted by varying at least one of the thickness, density, and structure of, and material used for the carbon nanotube structured layer.

In another embodiment, the carbon nanotube structured layer is a layer of single wall carbon nanotubes (SWCNTs).

In another embodiment, the first and the second electrical terminals are electrically coupled to the carbon nanotube structured layer by at least one of crimping, an electrically conductive adhesive, an electrically conductive paste, a pressure fitting, a foil, a fastener, and a clamp.

In another embodiment, the carbon nanotube structured layer and the electromotive force are selected to produce at least one of a tack temperature in the range of 100-150° F. with a tolerance of +/−10° F. (38-66° C. with a tolerance of +/−6° C.) and debulking temperature in the range of 100-200° F. with a tolerance of +/−10° F. (38-93° C. with a tolerance of +/−6° C.).

In another embodiment, the carbon nanotube structured layer and the electromotive force are selected to produce a curing temperature in the range of 150-400° F. with a tolerance of +/−10° F. (66-204° C. with a tolerance of +/−6° C.).

In yet another embodiment, a method of constructing a heated composite tool includes placing a first isolation ply pre-impregnated with a resin, the resin including a curing agent, over a base structure formable into a shape of a composite part that is to be produced, placing first electrodes on the isolation ply in first and second electric terminal locations to define a first end and a second end of a first current path, placing a carbon nanotube structured layer over the first isolation ply and the electrodes to further define the first current path and connect the first end and the second end of the first current path, placing a second isolation ply pre-impregnated with a resin, the resin including a curing agent, over the carbon nanotube structured layer and the electrodes, and curing the first and the second isolation plies.

In another embodiment, the method further includes placing second electrodes on the carbon nanotube structured layer in the first and the second electric terminal locations prior to placing the second isolation ply, the first and the second electrodes sandwiching respective portions of the carbon nanotube structured layer in the first and the second terminal locations.

In another embodiment, the method further includes applying an electromotive force across the electrodes in the first and the second electric terminal locations to heat the tool to at least one of a tack temperature in the range of 100-150° F. with a tolerance of +/−10° F. (38-66° C. with a tolerance of +/−6° C.) and debulking temperature in the range of 100-200° F. with a tolerance of +/−10° F. (38-93° C. with a tolerance of +/−6° C.).

In another embodiment, the method further includes increasing the electromotive force to produce a curing temperature in the range of 150-400° F. with a tolerance of +/−10° F. (66-204° C. with a tolerance of +/−6° C.).

In another embodiment, the method further includes drilling holes through the electrodes and the carbon nanotube structured layer in the first and the second terminal locations.

In another embodiment, a method further includes inserting threaded fasteners having a head and a threaded shaft, through the holes drilled in the electrodes and the carbon nanotube structured layer in the first and the second terminal locations, placing insulating washers sized to the threaded fasteners over the threaded shafts of the threaded fasteners and against the composite build structure, the insulating washers preventing the threaded fasteners from making electrical contact with the composite build structure, and placing nuts sized to the threaded fasteners on the threaded shafts of the threaded fasteners, and tightening the nuts against the insulating washers, the threaded fasteners and the nuts sandwiching the electrodes and the carbon nanotube structured layer together in the first and the second terminal locations.

In another embodiment, the method further includes attaching lead wires to the threaded fasteners.

In another embodiment, the method further includes attaching lead wires to the electrodes by at least one of crimping and clamping.

In another embodiment, the method further includes applying at least one of an electrically conductive adhesive and an electrically conductive paste to the electrodes to at least one of hold the electrodes in place and enhance the electrical conductivity between the carbon nanotube structured layer and the electrodes.

In another embodiment, a method of forming two or more sheets of prepreg material includes providing a composite tool having a composite build structure shaped to a composite part that is to be produced, the composite build structure including a carbon nanotube structured layer configured as a joule-heating element, passing an electric current through the carbon nanotube structured layer to increase the temperature of the composite tool, positioning a first sheet of prepreg material on the composite build structure, whereby the composite tool increases the temperature of the first sheet of prepreg material by virtue of the electric current passing through the carbon nanotube structured layer, the tack of the first sheet of prepreg material increasing, thereby aiding the positioning of the first sheet on the composite build structure, positioning a second sheet of prepreg material over the first sheet of prepreg material on the composite build structure, whereby the composite tool also increases the temperature of the second sheet of prepreg material also by virtue of the electric current passing through the carbon nanotube structured layer, the tack of the second sheet of prepreg material also increasing, thereby aiding the positioning of the second sheet relative to the first sheet.

In another embodiment, the method further includes increasing the current passing through the carbon nanotube structured layer whereby the tool debulks the first and the second sheets of prepreg material on the build structure.

In another embodiment, the method further includes increasing the current to cure the sheets without moving the sheets into an autoclave.

In yet another embodiment, a kit for constructing a heated composite tool includes a carbon nanotube structured layer having a top surface and a bottom surface, defining a current path having a first end and a second end, a plurality of electrodes configured for electrically coupling to the first end and the second end of the current path, a first isolation ply for electrically isolating the top surface of the carbon nanotube structured layer, and a second isolation ply for electrically isolating the bottom surface of the carbon nanotube structured layer.

In another embodiment, the kit for constructing a heated composite tool further includes a plurality of threaded fasteners, each having a head and a threaded shaft, the threaded shaft configured for passing through a hole drilled in the carbon nanotube structured layer, the plurality of electrodes, and a base structure having the shape of a composite part to be produced, a plurality of insulating washers sized to the threaded fasteners and configured to pass over the threaded shafts of the threaded fasteners and rest against the base structure, the insulating washers preventing the threaded fasteners from making electrical contact with the composite build structure, a plurality of nuts sized to the threaded fasteners configured for placement on the threaded shaft of the threaded fasteners, and configured for tightening against the insulating washers, the threaded fasteners and the nuts sandwiching the electrodes and the carbon nanotube structured layer together at the first and second ends of the current path, and at least one of an electrically conductive adhesive and an electrically conductive paste configured for application to the electrodes and the carbon nanotube structured layer to at least one of hold the electrodes in place and enhance the electrical conductivity between the electrodes and carbon nanotube structured layer.

In still another embodiment, the kit for constructing a heated composite tool includes at least one of the first and the second isolation plies comprising fiberglass, the electrodes, the threaded fasteners, and the nuts comprising at least one of titanium and Invar, and having a coefficient of thermal expansion matched to that of carbon fiber, and the insulating washers comprising ceramic and having a coefficient of thermal expansion matched to that of carbon fiber.

BRIEF DESCRIPTION OF THE DRAWINGS

Various embodiments of a heated composite tool are understood with regards to the following description, appended claims and accompanying drawings wherein:

DETAILED DESCRIPTION

Figure 1:
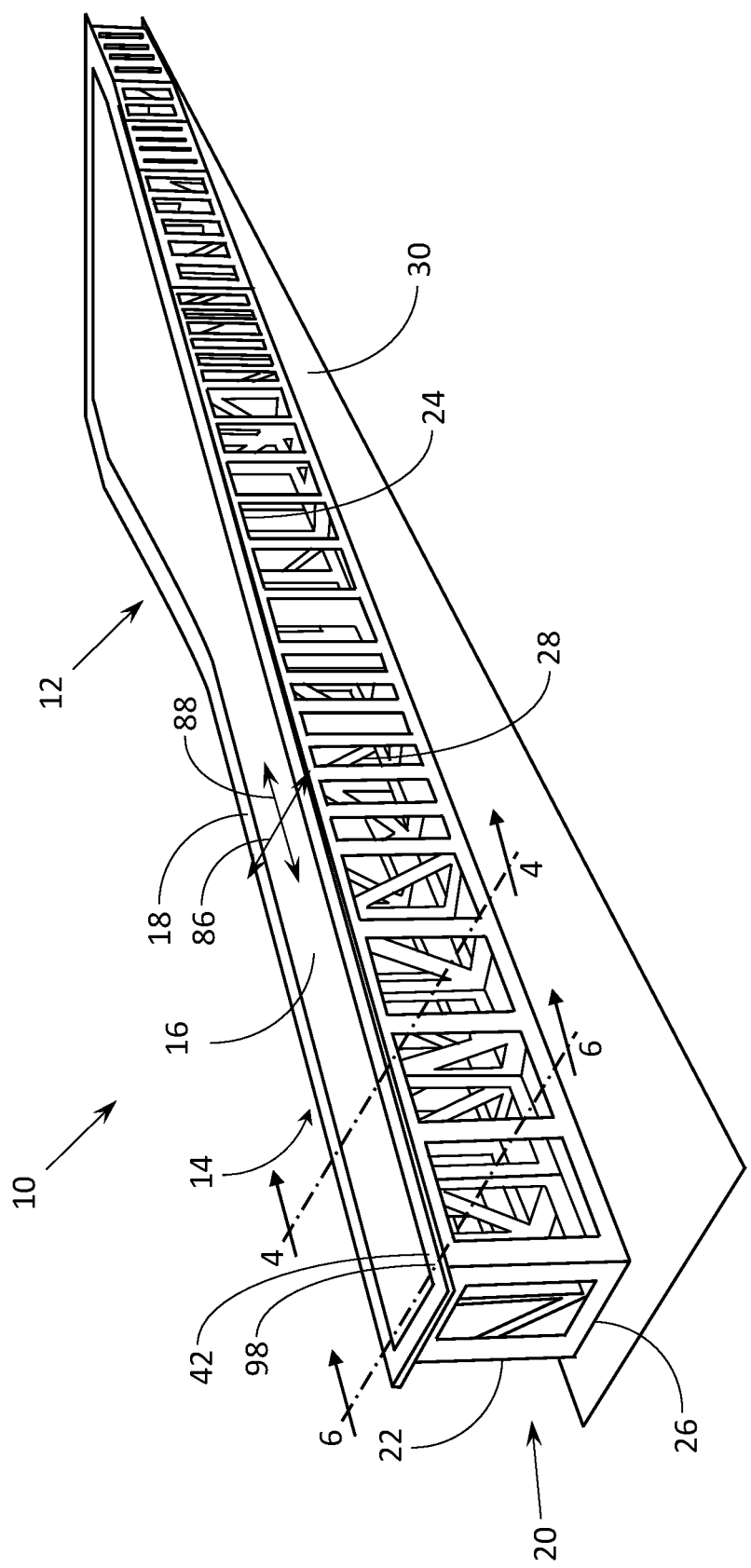
FIG. 1 is a perspective view of a heated composite tool of the present invention.

The present disclosure includes a heated composite tool useful for forming, debulking, and/or curing prepreg materials, and a method of constructing the same. The present disclosure also includes a kit for constructing a heated composite tool in accordance with principles of the present invention. The present disclosure also describes how a preexisting tool can be modified and/or adapted by the present invention to include heating for forming, debulking, and/or curing prepreg materials.

The heated composite tools and methods described herein have several advantages over conventional non-heated and heated tools that can be used for constructing parts from prepreg materials. Other present tools and methods are either devoid of heating capability entirely or require the use of other structures for heating or use other types of heating elements to form, debulk, and/or cure prepreg materials. In contrast, the present invention utilizes a carbon nanotube structured (CNT) layer as a joule-heating or resistive-heating element as will be taught hereinafter.

Definitions

The term, "tool," as used herein also refers to a "mold," "mold-tool," or "lay-up tool," the terms being used in alternate, the alternative, substitute, or the equivalent, the terms being interchangeable and/or synonyms.

The term, "composite material," as used herein refers to an engineered material that comprises two or more constituent materials, each with significantly different physical and/or chemical properties, which remain separate and distinct within a finished product, but which cooperate to form a material with enhanced physical properties.

The term, "prepreg," as used herein refers to a fiber fabric, for example, a woven or non-woven carbon fiber fabric, that has been pre-impregnated with a resin, for example, epoxy, including a curing agent, and that is ready to be used with a tool.

The term "tack," as used herein refers to the stickiness of a prepreg material. The tack is determined by the formulation of the resin used in the prepreg material and generally increases with the temperature of the prepreg material, the prepreg material becoming more and more sticky as the temperature of the prepreg material is increased. Tack is desirable when placing a prepreg material or when locating two or more sheets of prepreg material relative to one another, such as in the process of laying up a composite part. In certain instances, a lack of tack can lead to void formation in a final composite laminate.

The term, "coefficient of thermal expansion (CTE)," as used herein, describes how the size of an object changes with a change in temperature. Specifically, it measures the fractional change in size per degree change in temperature at a constant pressure. Several types of coefficients have been developed, and include: volumetric, area, and linear. As used herein, the relationship between the CTE of the tool and the CTE of the part being produced using the tool, or the relative CTEs of the tool and the part are of import as a difference in the CTEs can affect the dimensional accuracy of the part and/or the final product.

The term, "springback," as used herein, refers to the tendency of a material, i.e., a prepreg, to deviate from the tool shape due to cure shrinkage in the composite material.

The term, "Invar®," also known generically as FeNi36 or 64FeNi in the United States, and as used herein, is a nickel-iron alloy notable for its uniquely low coefficient of thermal expansion. The name, Invar®, is derived from the word "invariable," referring to its relative lack of expansion or contraction with changes in temperature. Invar® was invented in 1896 by Swiss physicist Charles Edouard Guillaume who receive the Nobel Prize in Physics in 1920 for its discovery.

Term, "facesheet," or "composite facesheet," as used herein refers to the outer most surface material of a tool upon which or against which lay-up materials, i.e., prepregs, are placed in the process of building a composite part.

Prepreg Materials

A composite material refers to an engineered material that comprises two or more constituent materials, each with significantly different physical and/or chemical properties, which remain separate and distinct within a finished product, but which cooperate to form a material with enhanced physical properties. Two exemplary constituent composite materials are a fiber and a resin.

Fibers usually add rigidity and impede crack propagation within a resin. Thin fibers can have very high strength, and so long as they are mechanically well attached to the resin matrix, greatly improve the overall strength of the composite material. Fiber reinforced composite materials can be divided into two main categories typically referred to as short fiber-reinforced materials and continuous fiber-reinforced materials. Continuous fiber-reinforced materials often comprise a layered or laminate structure. The woven and continuous fiber styles are typically available in a variety of forms, being pre-impregnated with the given matrix (resin), dry, uni-directional tapes of various widths, plain weave, harness satins, braided, and stitched. Continuous fiber styles that are pre-impregnated with a resin can be referred to as "prepregged" and/or "wet." The short and long fibers are typically used in compression and sheet molding operations, and come in the form of flakes, chips, chop, and woven and non-woven patterns laid in uniform or random fashion until the desired thickness of a ply is achieved or realized. Common fibers used for reinforcement include carbon fibers, glass fibers, cellulose (wood/paper fiber and straw), and high strength polymers, such as aramid, for examples. Silicon fibers can also be used for some high temperature applications.

The resin can be, for example, epoxy, bismaleimide (BMI), acrylonitrile butadiene styrene (ABS), acetal, acrylic, cellulose acetate butyrate (CAB), chlorinated polyvinyl chloride (CPVC), ethylene chlorotrifluoroethylene (ECTFE), Fluorosint, polyamide (nylon), polyether ether ketone (PEEK), polyethylene terephthalate (PET), polycarbonate, polypropylene, polysulfone, polyphenylene (PPS), polyvinyl chloride (PVC), polyvinyl alcohol (PVA), polyvinylidene fluoride or polyvinylidene difluoride (PVDF), polytetrafluoroethylene (PTFE), Tecator, styrene acrylic, phenoxy, polyurethane, or ultrahigh molecular weight polyethylene (UHMPE or UHMW), the resin being specified, in part, for its tacking, debulking and/or curing temperature(s), and the heat that is produced by a heated composite tool in accordance with principles of the present invention is related to the resin as will be described hereinafter.

More specifically, and as used herein, epoxy refers to any of the basic components or the cured end products of epoxy resins, as well as a colloquial name for the epoxide functional group. Further, these epoxy resins, also known as polyepoxides, are a class of reactive prepolymers and polymers that contain epoxide groups. Epoxy resins may be reacted, i.e., crosslinked, either with themselves through catalytic homopolymerisation, or with a wide range of co-reactants including polyfunctional amines, acids and acid anhydrides, phenols, alcohols, and thiols. These co-reactants are often referred to as hardeners or curatives, and the cross-linking reaction being commonly referred to as curing—reaction of polyepoxides with themselves or with polyfunctional hardeners form a thermosetting polymer, and, as such, curing can be initiated by raising the epoxy to a specified temperature.

It will be apparent to a person of ordinary skill in the art that the present invention as disclosed and described hereinafter is specifically tailored to use with woven and non-woven carbon fiber composite plies or sheets pre-impregnated with an epoxy resin containing a curing agent, i.e., prepregged and/or wet. However, the present invention is in no way limited to woven and non-woven carbon fiber sheets pre-impregnated with an epoxy resin, but rather, can be applied by a person of ordinary skill in the art, as desired, to other materials including other types of fibers, and using resins other than epoxy. A large commercial airplane wing will be used as a non-limiting example hereinafter of an instance where the present invention can bring value, e.g., time and money, as the cost of the tooling for such parts in very high, as is the cost of the parts themselves.

Embodiments of the Invention

Referring now to FIG. 1, a perspective view of a heated composite tool 10 in accordance with principles of the present invention is shown. In an embodiment, the heated composite tool 10 can be used to manufacture or produce a panel or wing skin 12 that is a constituent or component part, i.e., a subpart, of a large commercial airplane wing, the wing comprising four individual or separate wing skins in the example, that, once produced, are assembled to form an airfoil that allows a fuselage to which it is attached to move through the air efficiently and in a particular manner. A person of ordinary skill in the art will appreciated that one, some, or all of the wing skins, and the fuselage can be produced using respective heated composite tools in accordance with principles of the present invention.

Further, a person of ordinary skill in the art will also appreciate that the heated composite tool 10 is of the outside mold line (OML) variety, meaning that the tool is situated on the windward side or outer portion of the wing skin 12. However, the present invention is not limited to OML tools, but rather, applies equally well to inside mold line (IML) tools, whereby the tool is situated on the inside of the part, away from the wind, such as, for example, in a tool that can be used for the fuselage mentioned hereinabove. A person of ordinary skill in the art will further appreciate that other embodiments of a heated composite tool of both OML and IML varieties can also be built to manufacture other parts, and that some pre-existing composite tools can be adapted to including heating in accordance with principles of the present invention as will be described in more detail hereinafter.

The heated composite tool 10 comprises a composite build structure 14 having the shape of a composite part, e.g., the wing skin 12, that is to be produced. In one embodiment, and as shown in FIG. 1, a worksurface 18 of the composite build structure 14 has the contour or shape of the wing skin 12—it being somewhat difficult to identify the concave shape of the composite build structure 14 because the wing skin 12 is so large and its contour so gradual. However, a person of ordinary skill in the art will appreciate that the present invention is not limited to any particular contour or shape but rather, applies equally well to all contours and shapes. Further, a person of ordinary skill in the art will also appreciate that the present invention can be particularly suited to those shapes having tight inside corners and/or recesses as the heating structure described hereinafter can also be formed to follow those contours and shapes well due to its thinness and flexibility.

The composite build structure 14 is configured to receive and support prepreg materials 16 during lay-up in accordance with a "build sheet," "part program," or "lay-up plan" that designates the type, kind, (e.g., carbon fiber woven and non-woven sheets), orientation, and/or quantity of layers or composite sheets that are to be used to construct a part. Many parts require many sheets in multiple layers to arrive at or realize their requisite strength. For example, since wing skin 12 is a large part in a large wing of a large commercial aircraft, the build sheet for the wing skin 12 calls for many, many sheets in upwards of ninety layers, and typically requires debulking in succession or periodically, approximately every five to ten layers. Historically, this has made production of the wing skin 12 a time consuming and laborious task as the placement of the first layer of sheets on the tool and the subsequent placement and relative positioning of additional sheets in additional layers has been challenging, relying on the relative tack of the prepreg materials—most tools are devoid of heating capability, and heat blankets are commonly used to warm the sheets. However, with the advent of the present invention and, in particular, in a first heating benefit, the tack is improved and the process of positioning prepreg materials 16 is eased, allowing the panel or wing skin 12 to be constructed with greater confidence and in a more efficient manner in a lesser amount of time and with less cost. Further, in a second heating benefit, the present invention can be used to debulk prepreg materials, alone or in combination with heat blankets. This can, in certain instances, decease the opportunity for void formation in the wing skin 12, and further decreases the production time by virtue of heating the prepreg materials 16 from both the top and the bottom. Further still, in a third heating benefit, the present invention can be used to cure the prepreg materials 16, again, alone or in combination with heat blankets, further eliminating the need for moving the tool and the laid up and debulked prepreg materials 16 into an autoclave. This is often referred to as "out-of-autoclave" processing or "OoA," for short. This is particularly advantageous as some parts, such as, for example, the wing skin 12, are simply too big and their respective tools too heavy and/or too expensive to facilitate or risk moving into an autoclave.

In one embodiment, the heated composite tool 10 can be more than 110 feet (30.5 meters) long, up to 21 feet (6.4 meters) wide, and weigh approximately 80,000 pounds (36,287 kilograms). A portion of the size and weight of the heated composite tool 10 comes from the need for precision and/or dimensional accuracy in the wing skin 12, and from the need to match, liken, and/or assimilate, referred to hereinafter generally as "matching," the CTE of the tool to the part being produced. Again, since the wing skin 12 is a component part of a large commercial airplane wing, and since that wing is assembled from four separate wing skins, any variation in the size of the wing skin 12 relative to its dimensional specifications can lead to difficulty in assembling the wing, the subparts not fitting together properly. Further, since the wing must be attached to a fuselage, any variation in the size of the wing skin 12 relative to its dimensional specifications can also lead to difficulty in attaching the wing to the fuselage, the wing not mating up with the fuselage properly. Moreover, since any difference in the CTE of the heated composite tool 10 and the prepreg materials 16 used to construct the wing skin 12 can also result in dimensional variation in the wing skin, the same applies.

Further, where the heated composite tool 10 and the prepreg materials 16 used to construct the wing skin 12 have significantly different CTEs, "microcracking" in the wing skin 12 can result. Microcracking describes and refers to those instances where the laminate reaches a stress level where the resin begins to crack away from the fiber reinforcements that are not aligned with the applied load. These cracks tend to spread though the resin matrix. This is sometimes also referred to as "transverse microcracking" and, although the laminate has not completely failed at this point, the break down process has commenced. As the ultimate strength of a laminate in tension is governed by the strength of the fibers, the microcracks do not immediately reduce the ultimate strength properties of the laminates. However, in an environment containing water or even moist air, a microcracked laminate can absorb considerably more water than an uncracked laminate. This can lead to an increase in weight, moisture attack on the resin and any fiber sizing agents, loss of stiffness and, with time, an eventual drop in the ultimate properties. This is particularly important for aerospace vehicles as they fly in and are exposed to all sorts of environmental conditions containing water. Moreover, avoiding microcracking in production often results inefficiencies, such as lost production time and/or additional inspection time, scrap, waste, part failures, etc. Differences in CTE can also can also effect "springback," changing the dimensional accuracy of the wing skin 12, with similar difficulties in assembly.

To realize the dimensional accuracy required of the wing skin 12, the heated composite tool 10, along with CTE matching, further comprises a rigid and dimensionally stable framework 20 that is coupled to and supports the composite build structure 14 and any prepreg materials 16 located thereon during lay-up. In some embodiments of the present invention, the framework 20 includes uprights 22, stringers 24, cross members 26, and cross braces 28, physically coupled together, such as through welding, bolting, etc., all of which function together, in unison, to form a rigid and dimensionally stable structure in conjunction with the composite build structure 14. In some embodiments, a walkway or catwalk 30 can be included to facilitate personal accessing the worksurface 18 in laying up the prepreg materials 16. A person of ordinary skill in the art will appreciate that other types of structural frameworks can be used as needed and desired without departing from the spirit of the present invention.

Figure 2:
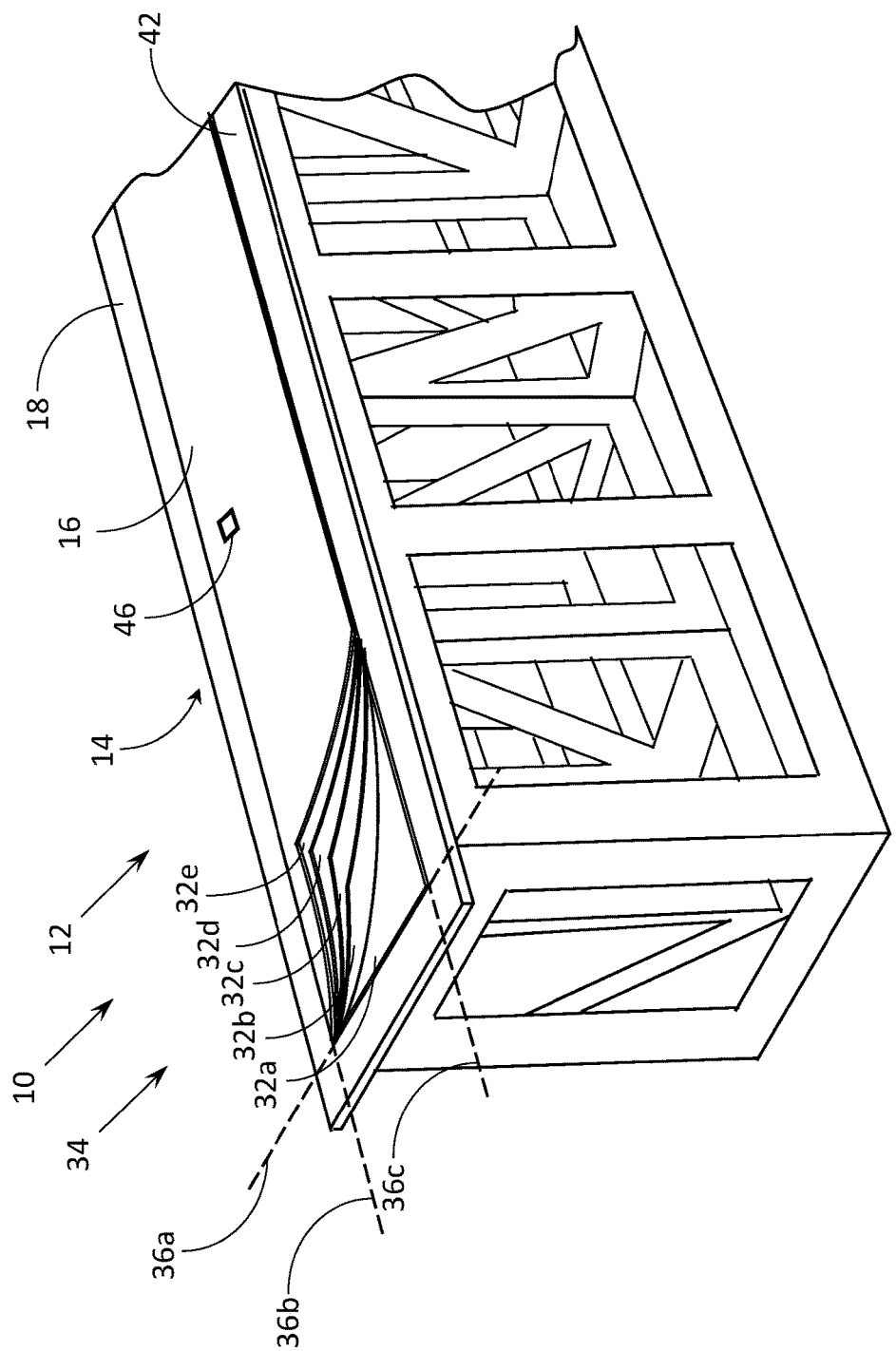
FIG. 2 is a partial perspective view of a heated composite tool of the present invention with a plurality of prepreg sheets.

Referring now to FIG. 2, a partial perspective view of the heated composite tool 10 is shown to facilitate the description of the prepreg materials 16. The prepreg materials 16 comprise a number or plurality of carbon fiber prepreg sheets 32a-e, the near corner of the upper four sheets 32b-e shown turned up in FIG. 2 to facilitate viewing. In this example, each carbon fiber prepreg sheet 32a-e defines a respective layer in the wing skin 12. However, a person of ordinary skill in the art will appreciate that each layer can, in other embodiments, include multiple sheets—again, a single sheet 32a-e being shown in each layer in FIG. 2 for purposes of clarity and ease of explanation. A person of ordinary skill in the art will also appreciate that additional layers and/or sheets could also be included however, only five sheets 32a-e in five layers are shown in FIG. 2 to facilitate an ease of explanation. A person of ordinary skill in the art will further appreciate that the present invention is not limited to any particular number of sheets or layers but rather, applies equally well to any numbers of sheets in any number of layers.

Further, and also for example, in the lay-up 34 shown, five prepreg carbon fiber sheets 32a-e are used, some of which can be a non-woven fabric, e.g., sheet 32a, and others of which can be woven fabrics, e.g., sheets 32b-e, all of which are typically vapor permeable to facilitate bagging in debulking as will be further described hereinafter. In one embodiment, a non-woven fabric 32a can be used as the outer most layer, i.e., a surfacing ply, while woven fabrics 32b-e can be used for the inner most or other layers to provide the requisite strength for the part. In an OML tool, this arrangement works to minimize the amount of resin and/or fillers needed to provide a smooth outer surface for the wing skin 12, for example. The converse would be true for an IML tool, the surfacing plys being laid up last. Again, a person of ordinary skill in the art will appreciate that any type of composite materials can be used, as desired, with the heated composite tool 10, and that the present invention is not limited to any particular type or construction of composite materials. It should also be appreciated that the present invention can also be applied to hand lay-up of dry fiber material, whereas the resin is applied (also by hand) during the laminate lay-up process.

Prepreg materials can be positioned on the worksurface of a tool using physical templates or laser projected lines. In one embodiment, FIG. 2 shows a set of laser-projected dashed lines 36a-c that can be used to locate the prepreg materials 16, i.e., sheets 32a-e, on the worksurface 18 of the composite build structure 14 of the heated composite tool 10. In another embodiment, a different template or projection can be used for each layer in a build sheet, part program, or lay-up plan for a part. In still another embodiment, multiple templates or projections can be used for one or more of the layers in a build sheet, part program, or lay-up plan. In addition to placement information, these templates or projections can also include information such as the type, kind, orientation, and number of composite sheets that are to be used to construct a part. In the embodiment shown in FIG. 2, a single set of laser projected lines 36a-c is shown for ease of illustration and purposes of explanation. A person of ordinary skill in the art will appreciate that additional sets of lines can be used, one set for each layer or multiple sets in one or more layers, or that physical templates can be substituted without departing from the spirit of the present invention.

Still referring to FIG. 2, once worksurface 18 is warmed in accordance with principles of the present invention, as will be discussed in more detail hereinafter, the tack of any prepreg materials placed on the worksurface 18 will be increased. In one embodiment, the present invention is configured to produce a tack temperature in the range of in the range of 100-150° F. with a tolerance of +/−10° F. (38-66° C. with a tolerance of +/−6° C.) appropriate for the resin contained in the prepreg sheets 32a-e, and/or for carbon fiber composites used in aerospace vehicles, such as airplanes, helicopters, spacecraft, missiles, and the like.

Specifically, and sequentially, the tack of the prepreg sheet 32a is increased by virtue of having been placed on the heated worksurface 18, as shown in FIG. 2. The increase in the tack of the prepreg sheet 32a provides two benefits. First, the increase in the tack works to cause the prepreg sheet 32a to cling, stick, or adhere to the heated worksurface 18, thereby holding the prepreg sheet 32a in position and/or "locating" the prepreg sheet 32a relative to the laser projected lines 36a-c. Second, the prepreg sheet 32a clinging, sticking, or adhering to the heated worksurface 18 works to prevent the prepreg sheet 32a from moving during the placement of subsequent sheets of prepreg material in subsequent layers, i.e., prepreg sheets 32b-e. A person of ordinary skill in the art will appreciate that oftentimes, and in another embodiment, the laser projected lines from a previous layer can be removed prior to projecting lines for a subsequent layer so as not to confuse lay-up personnel. This makes the adherence of sheets in previous layers critical, as no placement lines are available for ensuring that the sheets in the previous layers remain in place. Moreover, some sheets can be covered up, there being no visual indication available for ensuring that those sheets have remained in place. Accurate placement of many sheets, in a number of layers, is critical in building high reliability aerospace parts, such as wing skin 12, for example.

Continuing, once the prepreg sheet 32a is located, warmed, and held in position, a subsequent layer of prepreg material, i.e., the prepreg sheet 32b, can be placed. The heat from the worksurface 18, passes through the prepreg sheet 32a, increasing the tack of the prepreg sheet 32b as well, and similar benefits apply. Specifically, (i) the increase in tack of the prepreg sheet 32b works to cause the prepreg sheet 32b to cling, stick, or adhere to the prepreg sheet 32a, thereby holding the prepreg sheet 32b in position and/or "locating" the prepreg sheet 32b, e.g., relative to laser projected lines 36a-c, and (ii) the prepreg sheet 32b clinging, sticking, or adhering to the prepreg sheet 32a works to prevent the prepreg sheets 32a, 32b from moving during the placement of subsequent sheets of prepreg material in subsequent layers. Similar benefits apply, in turn, to the prepreg sheets 32c-e.

Thus, the aforementioned benefits of the present invention, maintaining the position of prepreg materials in an initial layer and in a previous layer or layers when placing a subsequent layer is particularly useful, and allows personnel to build in a confident and expeditious manner, in many instances with a reduction in build time, such as when compared to using non-heated tools, and having to use heating blankets for increasing the tack of prepreg materials.

Figure 3:
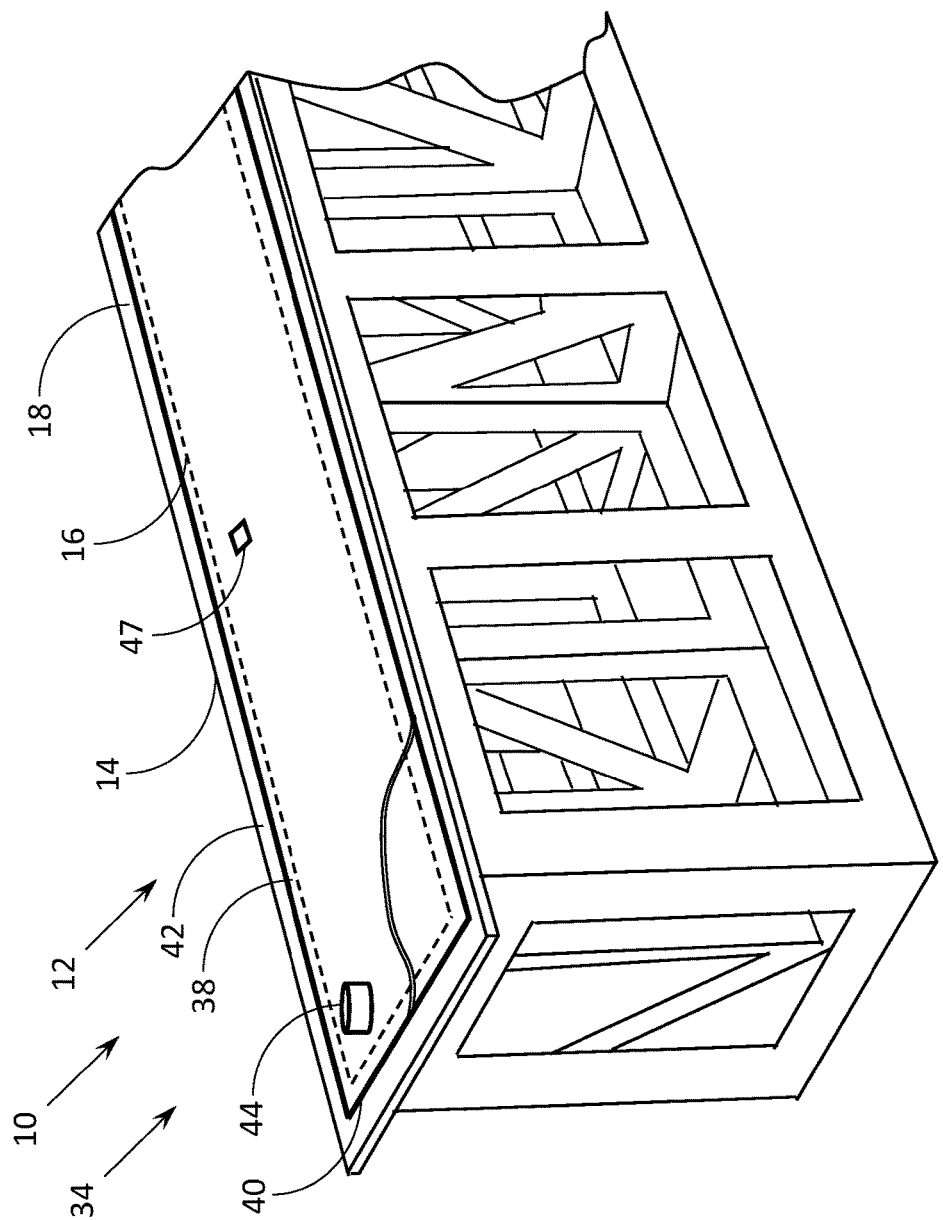
FIG. 3 is another partial perspective view of a heated composite tool of the present invention with a plurality of prepreg sheets bagged.

Referring also to FIG. 3, the heat composite tool 10 can also be used for heated debulking in accordance with principles of the present invention, alone or in combination with one or more heating blankets. Typically, the build sheet, part program, or lay-up plan will call for debulking, periodically, once a particular number of layers has been laid up, or at the conclusion of lay-up, prior to curing. In one embodiment, the build sheet, part program, or lay-up plan can call for debulking the prepreg sheets 32a-e, i.e., at five layers. Debulking is the process of compacting the laminate or lay-up 34 under moderate heat and pressure and/or vacuum to remove air from between the prepreg sheets 32a-e, ensure seating of the prepreg sheets 32a-e on the heated composite tool 10, and/or to prevent wrinkles in the prepreg sheets 32a-e. Debulking in this manner typically includes placing a vapor impermeable barrier, e.g., a clear plastic sheet 38, over the prepreg materials 16, sealing the sheet 38 against the worksurface 18, for example, using a vacuum sealant tape 40, around the periphery of the prepreg materials 16 in a worksurface margin 42, and withdrawing the air from between the worksurface 18 and the sheet 38, such as through an orifice or port 44. This process is oftentimes generally referred to as "bagging" a part, e.g., the wing skin 12, since with smaller parts, the entire part can be placed in a plastic bag, for example, rather than sealing off an air space against a surface.

In accordance with principles of the present invention, and as will be discussed in more detail hereinafter, the temperature of the worksurface 18 can be raised to a debulking temperature appropriate for the resin contained in the prepreg sheets 32a-e. In one embodiment, the present invention is configured to produce a debulking temperature in the range of 100-200° F. with a tolerance of +/−10° F. (38-93° C. with a tolerance of +/−6° C.) appropriate for the resin contained in the prepreg sheets 32a-e, and/or for carbon fiber composites used in aerospace vehicles, such as airplanes, helicopters, spacecraft, missiles, and the like.

Thereby, and with the embodiment described and shown in FIGS. 1-3, the heated debulking is conducted or occurs in place or "in situ," on the heated composite tool 10, and "out-of-autoclave (OoA)," from the heat provided by the heated composite tool 10 to the bottom of the prepreg materials 16 and from atmospheric pressure pressing the prepreg materials 16 against the worksurface 18 of the tool 10 from the top. Further, and in another embodiment, one or more heat blankets can be added or placed over the sheet 38 or "bag" and the prepreg materials 16 located thereunder to further heat the prepreg materials 16. In this embodiment, heat is applied to the prepreg materials 16 from the top by the one or more heat blankets and from the bottom by the heated composite tool 10. The combination of the heated composite tool 10 and the one or more heat blankets is particularly useful when the lay-up includes many layers and/or is very thick.

Debulking, in accordance with the present invention, is more efficient in terms of both part-making time, scrap-rate, rework, and general economy (cost), and without the associated risk of damaging the tool, when moving the subpart to and from an autoclave.

The heat composite tool 10 can also be used to cure the prepreg materials 16 upon the completion of lay-up in accordance with principles of the present invention, alone or in combination with the one or more heating blankets. For example, the temperature of the worksurface 18 can be further raised to a curing temperature appropriate for the epoxy resin contained in the prepreg sheets 32a-e. In one embodiment, the present invention is configured to produce a curing temperature in the range of 150-400° F. with a tolerance of +/−10° F. (66-204° C. with a tolerance of +/−6° C.) appropriate for the resin contained in the prepreg sheets 32a-e, and/or for carbon fiber composites used in aerospace vehicles, such as airplanes, helicopters, spacecraft, missiles, and the like.

Figure 4:
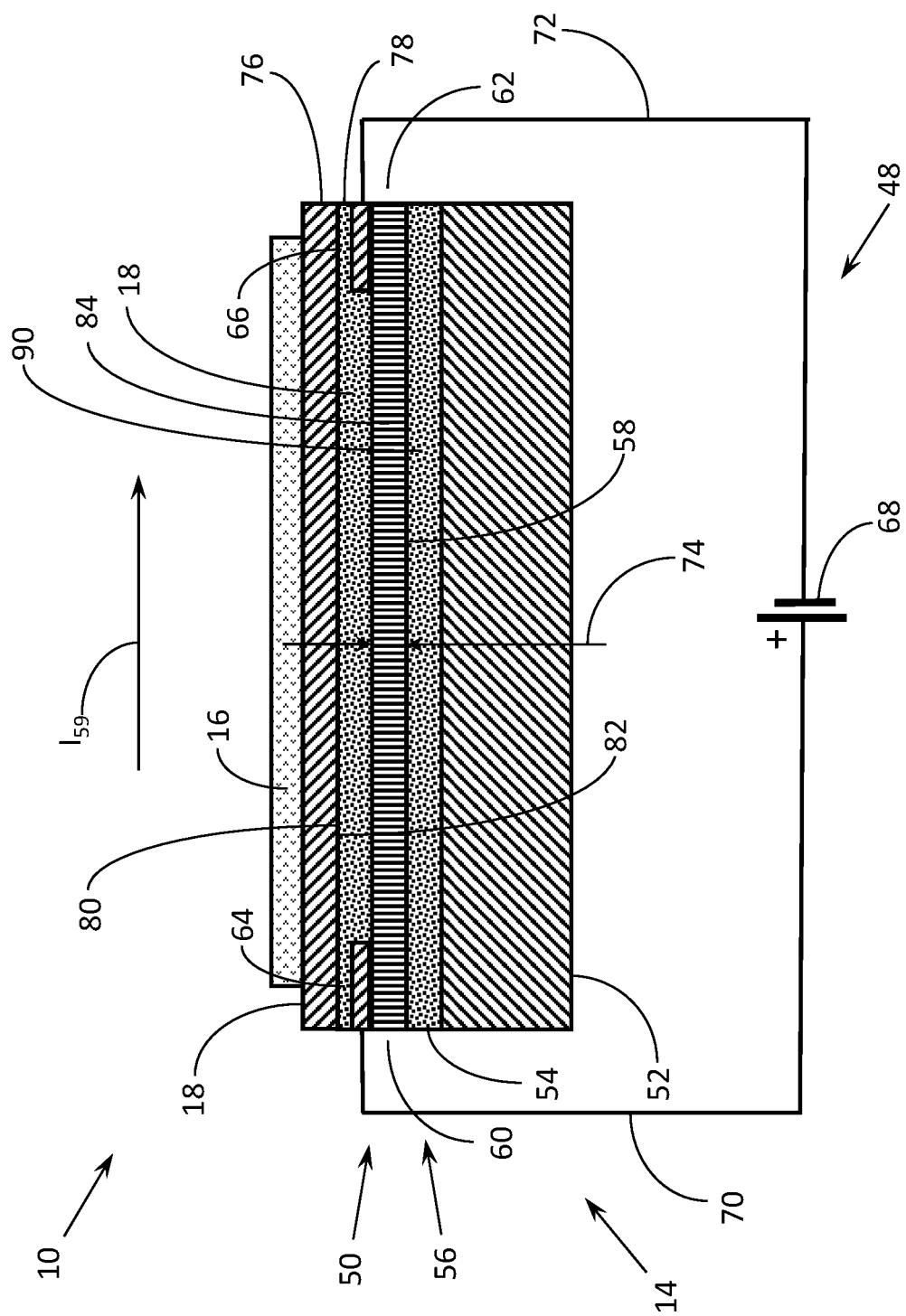
FIG. 4 is a cross section illustration of the composite build structure shown in FIG. 1, taken along line 4-4.

Referring now to FIG. 4, a cross sectional view of the composite build structure 14 including an exemplary heating structure 50 in accordance with principles of the present invention is shown. The composite build structure 14 further includes a base structure 52 and a first isolation ply 54.

In different embodiments, the base structure 52 can be constructed from a variety of materials depending on the part requirements. For example, for parts cured at ambient or low temperature, or for prototyping, Where tight control of dimensional accuracy is not required or critical materials such as fiberglass, high-density foams, machinable epoxy boards, and even clay or wood/plaster can be used. However, for high-performance composite parts that require a good surface finish and dimensional accuracy, such as aerospace parts, e.g., wing skin 12, materials such as carbon fiber including a resin and a curing agent, a carbon foam core and one or more carbon fiber laminates including a resin and a curing agent, or a machined carbon fiber/bisemaleimide (BMI) can be used. In other embodiments, other materials can include, but are not necessarily limited to, monolithic graphite, castable graphite, ceramics or metals, which are typically aluminum or steel. In the embodiment shown, the base structure 52 is made from carbon fiber/epoxy including a resin and a curing agent, that has been formed or machined to have the shape of wing skin 12, so that the heated composite tool 10 will have a CTE similar to or like that of the carbon fiber prepreg materials 16, i.e., matched, further providing for dimensional accuracy in producing parts as discussed hereinabove.

The heating structure 50 is physically coupled to the base structure 52, such as through lay-up and molding, and includes at least one heating element 56. The at least one heating element 56 comprises a carbon nanotube (CNT) structured layer 58 defining a current path $I_{59}$ having a first end 60 and a second end 62. A first electrical terminal 64 is electrically coupled to the first end 62 and a second electrical terminal 66 is electrically coupled to the second end 62 for purposes of connecting a power source. In one embodiment, the CNT structured layer 58 is responsive to an electromotive force 68 applied across the first and the second electrical terminals 64, 66, respectively, through wires 70, 72, forming an electric circuit 48, to heat the worksurface 18 of the heated composite tool 10. The current loop or electric circuit 48 comprises the electromotive force 68, the wire 70, the first electrical terminal 64, the CNT structured layer 58, the second electric terminal 66, and the wire 72.

Figure 5:
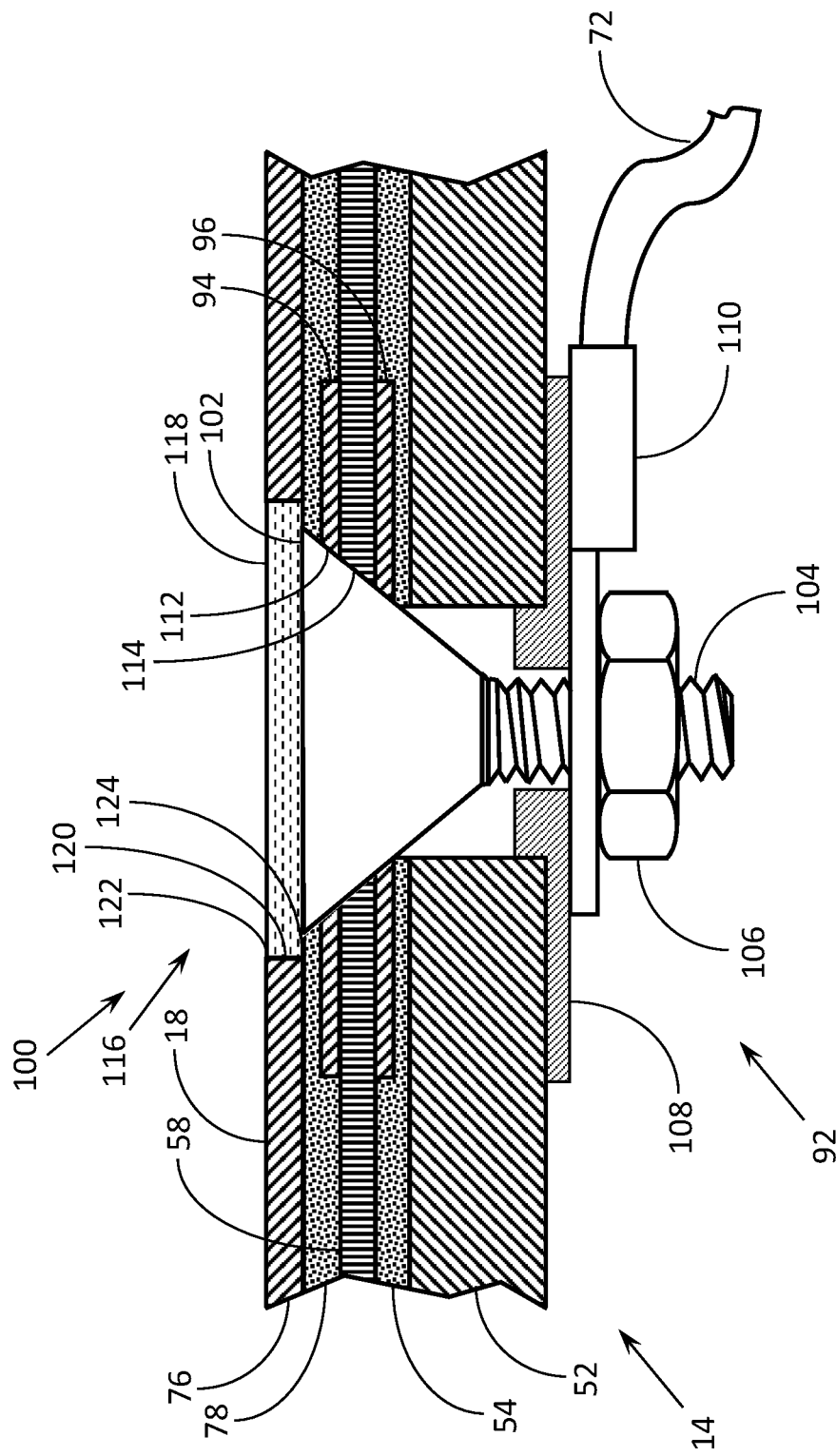
FIG. 5 is cross section illustration of the composite build structure shown in FIG. 1 showing an electrical terminal of the present invention, taken along line 6-6

In one embodiment of the present invention, the electric terminals 64, 66 are electrically coupled to the CNT structured layer 58 by pressure, e.g., a pressure fitting, and/or electrically conductive adhesives or pastes. In other embodiments of the present invention, fasteners or clamps that provide enough force against the CNT structured layer 58 to maintain acceptably low contact resistance can be used. For example, FIG. 5 shows an exemplary electric terminal comprising a fastener. In still other embodiments of the present invention, the electrical terminals 64, 66 are electrically coupled to the CNT structured layer 58 by crimping the terminals 64, 66 over an end or edge of the CNT structured layer 58.

In one embodiment, the electromotive force 68 can be an alternating current (AC) voltage source. In another embodiment, the electromotive force 68 can be a direct current (DC) voltage or current source. And in still another embodiment, the CNT structured layer 58 can be directly connected to an AC line voltage in a power distribution system, although consideration should be given to safety practices in doing so, for example, providing line isolation.

As illustrated in the electric circuit 48 in FIG. 4, the present invention utilizes the CNT structured layer 58 as joule-heating or resistive-heating element. In a straightforward application of Ohm's Law, where $V_s$ represents the electromotive force 68 and R represents the resistance of the CNT structured layer 58, the power dissipated ($P_{diss}$) in or the heat produced by the CNT structured layer 58 is directly proportional to the applied voltage ($V_s$), i.e., $P_{diss}=(V_s)^2/R$. It follows, that the heat produced by the heated composited tool 10 can be increased or decreased, by simply varying the voltage applied to the CNT structured layer 58. Further, by varying, adjusting, setting, or selecting, i.e., raising or lowering, the voltage potential provided by the electromotive force, the quantity of heat, in terms of power per unit area, e.g., watts per square inch (centimeter), produced by the heated composite tool 10 can be raised or lowered. In one embodiment, the voltage applied to the heated composite tool 10 can be selected to produce a tack temperature, increased to produce a debulking temperature, and further increased to produce a curing temperature.

In one embodiment of the present invention, the CNT structured layer 58 and the electromotive force 68 are selected to produce heat to raise the temperature of the prepreg materials 16 to a tack temperature, for example, to a temperature in the range of 100-150° F. with a tolerance of +/−10° F. (38-66° C. with a tolerance of +/−6° C.), a debulking temperature, for example, to a temperature in the range of 100-200° F. with a tolerance of +/−10° F. (38-93° C. with a tolerance of +/−6° C.), and a curing temperature, for example, in the range of 150-400° F. with a tolerance of +/−10° F. (66-204° C. with a tolerance of +/−6° C.).

In another embodiment, the electromotive force 68 provides a power density of approximately 0.1-1 watt per square inch (16-160 milliwatts per square centimeter), see FIG. 2 at reference numeral 46, for example, such a selection being made to achieve a tack temperature that causes the prepregged carbon fiber composite material sheets 32a-e to become clingy, sticky, and/or adhering. In another embodiment, the electromotive force 68 provides a power density of approximately 1-10 watts per square inch (0.2-1.6 watts per square centimeter), see FIG. 3 at reference numeral 47, for example, such a selection being made to achieve a debulking temperature that softens, and debulks prepreg carbon fiber materials 16, without curing the resin contained therein. If more power is applied, the heated composite tool 10 described herein can heat the prepreg materials enough to fully cure the resin. This affords use of the heated composite tool 10 for out-of-autoclave processing. Moreover, by using the CNT structured layer 58 of the present invention, the temperature and power density remains relatively constant and uniform across the length and width of the CNT structured layer 58 and the heated composite tool 10, as designated at reference numerals 86 and 88, respectively, in FIG. 1.

Referring once again to FIG. 4, the CNT structured layer 58 can be made in accordance with Patent Cooperation Treaty Publication Number WO 2016/019143 published on Feb. 4, 2016 and United States Patent Publication Number US 2017/0210627 A1 published on Jul. 27, 2017 or U.S. Pat. No. 9,107,292 B2 granted on Aug. 11, 2015, said publications and patent incorporated herein by reference. In another embodiment, the CNT structured layer 58 can be made of graphene.

In one embodiment of a process for manufacturing the CNT structured layer 58 a continuous conveying belt is moved along a path that traverses a pooling region and a vacuum box, and a continuous porous carrier material is applied to an upper side of the continuous conveying belt. An aqueous suspension of carbon nanotubes (CNTs) dispersed in a liquid is applied on the porous carrier material. In an embodiment, the dispersed CNTs have a median length of at least 0.05 mm and an aspect ratio of at least 2,500:1. A continuous pool of the aqueous suspension of the CNTs is formed over and across the width of the continuous porous carrier material in the pooling region, to a uniform thickness sufficient to prevent puddling upon the continuous porous carrier material. As the porous carrier material and the continuous pool of the aqueous suspension of the CNTs are advanced over the vacuum box, the liquid of the aqueous suspension of the CNTs is drawn by vacuum through the porous carrier material, thereby filtering a uniform dispersion of filtered CNTs over the porous carrier material to form a filtered CNT structure. Optionally any residual liquid from the filtered CNT structure can be dried to form a CNT sheet over the porous carrier material. Optionally the CNT sheet can be removed from the porous carrier material. In another embodiment of a process for manufacturing the CNT structured layer 58, carbon nanostructures that are branched, crosslinked, and that share common walls with one another are dispersed in a solvent until the carbon nanostructures are non-agglomerated. The solution is then passed through a support layer including a plurality of fibers, whereby the carbon nanostructures conform to the fibers and bridge across apertures or gaps between the fibers to form a continuous carbon nanostructure layer. In yet another embodiment of a process for manufacturing the CNT structured layer, a solution containing carbon nanostructures, that are branched, crosslinked and that shared common walls with one another, and chopped fibers are filtered to collect the carbon nanostructures on and between the fibers in a structured layer. In still other embodiments, the carbon nanostructures conforming to the fibers in a support layer or the chopped fibers filtered to collect the carbon nanostructures on and between the fibers in a structured layer are impregnated with a resin, e.g., an epoxy containing a curing agent.

In one embodiment of the present invention, the maximum quantity of heat, in terms of power per unit area, e.g., watts per square inch (centimeter), produced by the heated composite tool 10 can be adjusted by varying the thickness 74 and therefore the electrical resistance of the carbon nanotube structured layer 58, see FIGS. 2-4—the thickness 74 can be varied by adjusting the basis weight of the carbon nanotubes in the carbon nanotube structured layer 58 as will be discussed in more detail hereinafter. In yet another embodiment of the present invention, the maximum quantity of heat produced by the heated composite tool 10 can be adjusted by changing the carbon nanotube structure in the carbon nanotube structured layer 58, for example by using single wall carbon nanotubes (SWCNTs) or multi-walled carbon nanotubes (MWCNTs).

Figure 6:
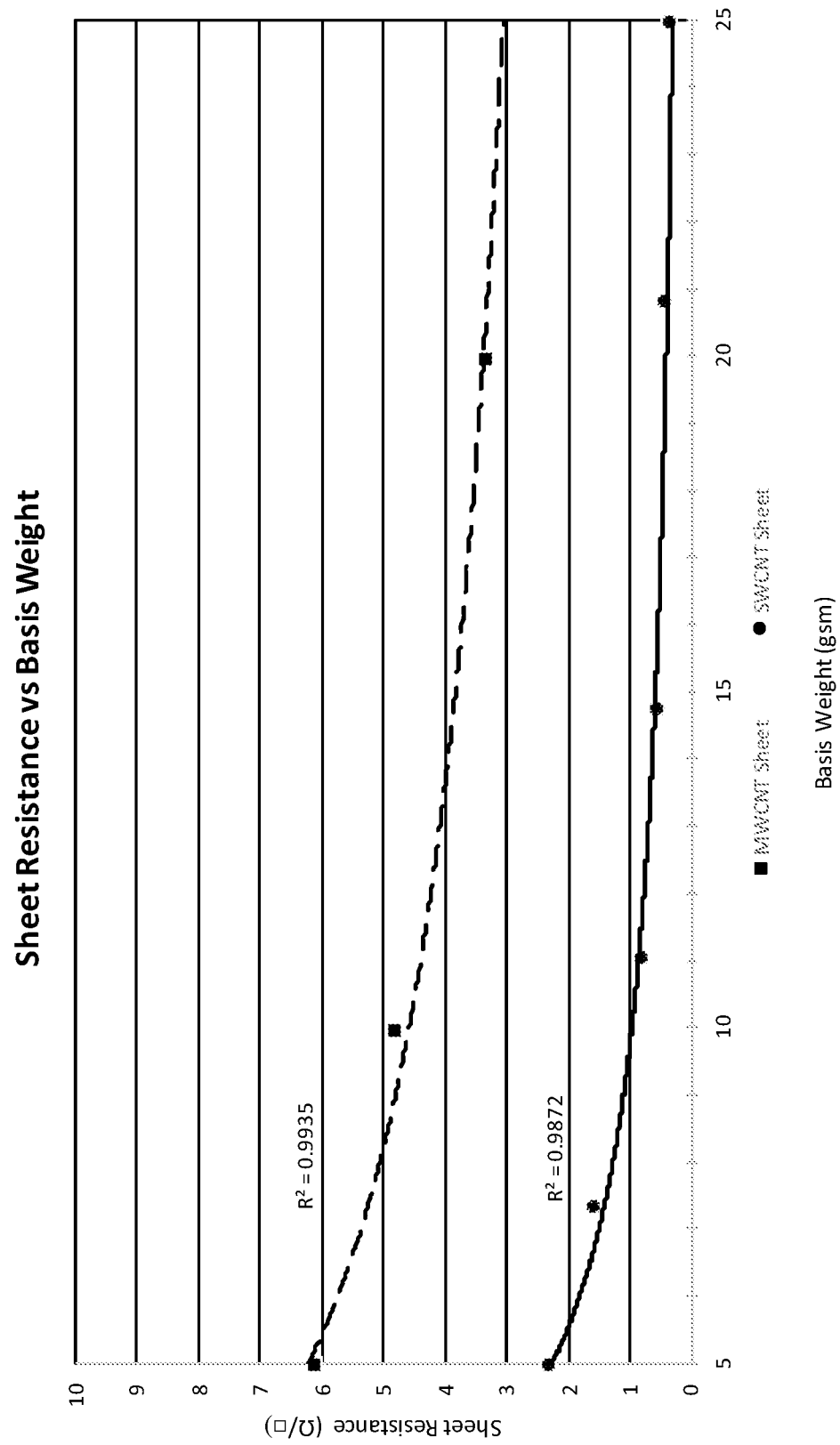
FIG. 6 is a graph comparing sheet resistances using multiwall carbon nanotubes (MWCNTs) and single wall carbon nanotubes (SWCNTs) for various basis weights.

For example, FIG. 6 shows a comparison of the sheet resistance using SWCNTs and MWCNTs for carbon nanotube basis weights between 5 and 25 grams per square meter (gsm). As shown, the useful sheet resistance using SWCNTs can be selected from any value between and inclusive of about 0.3 to about 0.8 ohms per square meter ($\Omega/\square$), while the useful sheet resistance using MWCNTs can be selected from any value between and inclusive of about 2.5 to about 6.1$\Omega/\square$. Thus, for a selected basis weight and given applied voltage ($V_s$), the quantity of heat produced by the heated composite tool 10 can be adjusted by simply changing the carbon nanotube structure used in the carbon nanotube structured layer 58, selecting either single wall carbon nanotubes (SWCNTs) or multi-walled carbon nanotubes (MWCNTs), for example.

Figure 7:
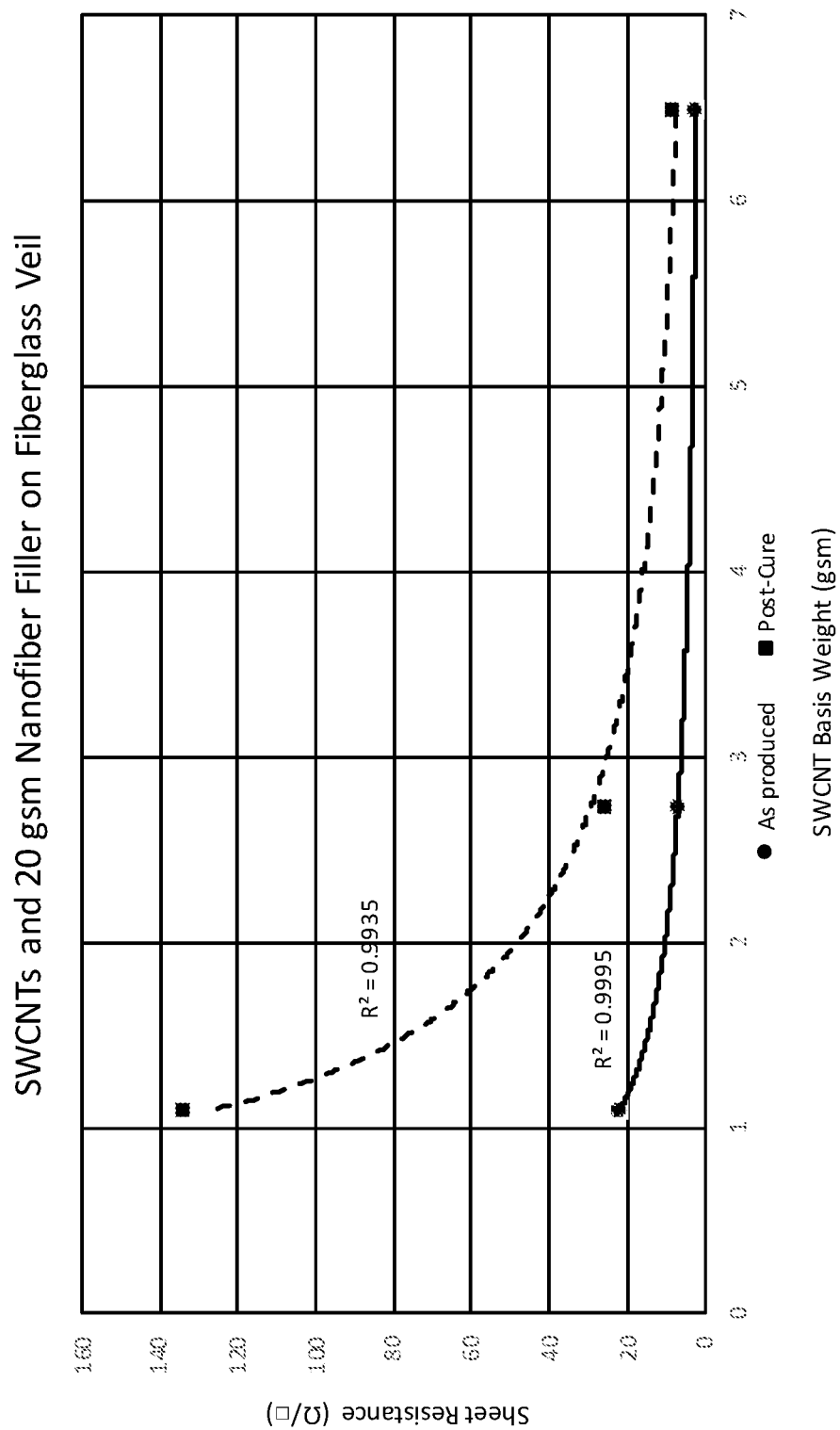
FIG. 7 is a graph showing the sheet resistance using single wall carbon nanotubes (SWCNTs) with 20 grams per square meter of nanofiber on a fiberglass veil pre- and post-cure.
Figure 8:
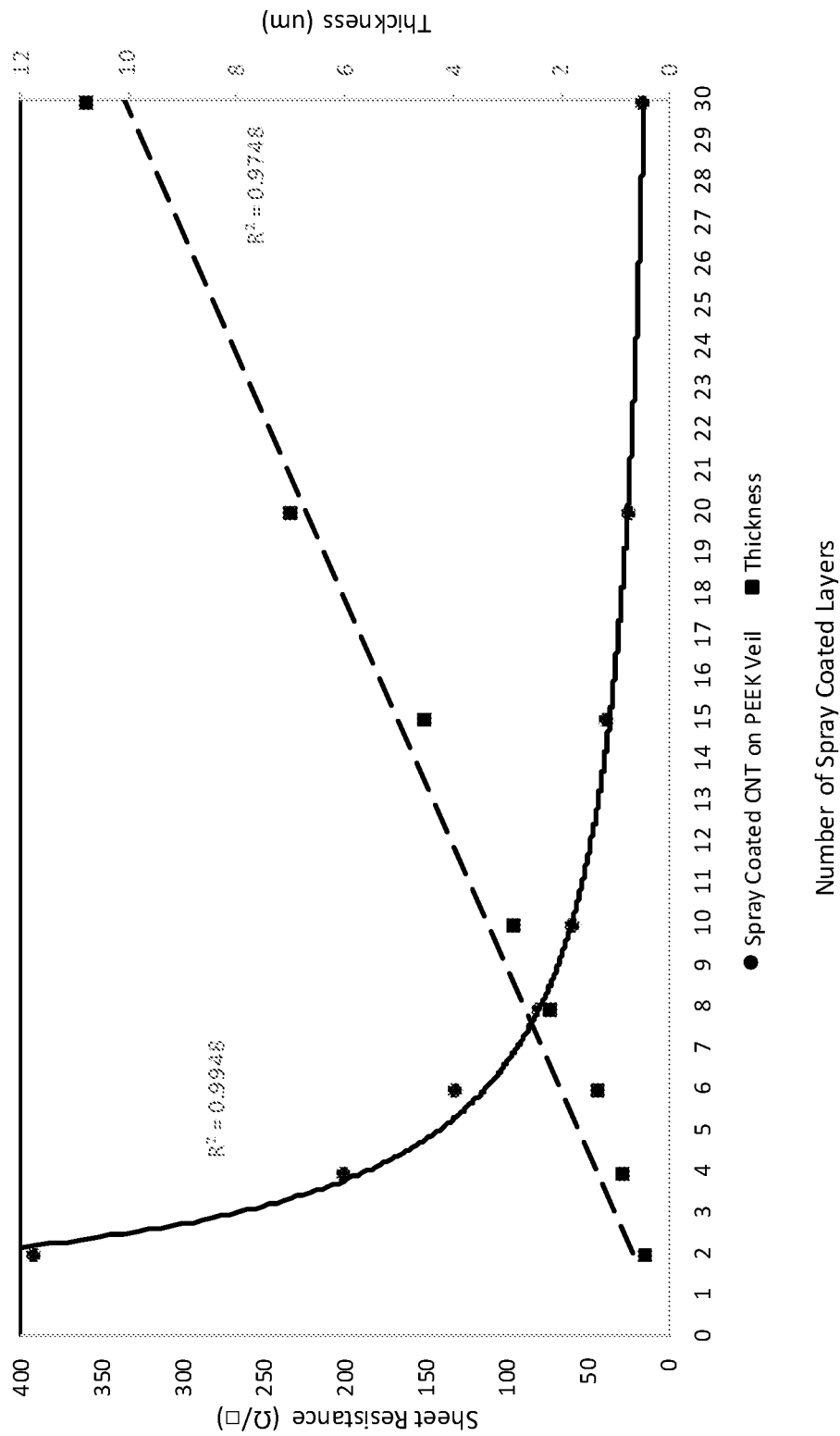
FIG. 8 is a graph showing the sheet resistance versus a number of spray coated layers of multiwall carbon nanotubes (MWCNTs), as well as the thickness for those spray coated layers.

In another embodiment of the present invention, wherein the CNT structured layer 58 is pre-impregnated with epoxy containing a curing agent, it has been found that the resistivity of the at least one heating element 56, as a general "rule of thumb," approximately triples from production of the carbon nanotube structured layer 58, referred to hereby as "As produced," to the at least one heating element 56 being pre-impregnated with epoxy containing a curing agent and cured, referred to hereby as "Post-cure." For example, FIG. 7 shows the sheet resistance of when between about 1.1 and 6.5 grams per square meter (gsm) of SWCNTs have been added to 20 grams per square meter (gsm) of nanofiber filler on a fiberglass veil. It has also been found that the nanofiber filler is typically only required for low SWCNT basis weights under about 5-10 gsm. Higher basis weights of carbon nanotubes generally do not require a nanofiber filler material. Further, it will be appreciated that the fiberglass veil is also not required; however, in one embodiment, the veil was included for improved handling. As shown, for SWCNT basis weights of 1.1, 2.8, and 6.5 gsm the "As produced" and "Post-cure" resistances are 22.0, 6.8, and 2.5$\Omega/\square$, and 133.5, 25.4, and 7.9$\Omega/\square$, respectively. Thus, the general "rule of thumb," that the sheet resistance approximately triples from production to post-cure holds, particularly for those basis weight above about 3 gsm. Therefore, in practicing the present invention, a person of ordinary skill in the art should make an allowance for a rise in resistivity of about threefold in targeting a particular resistance for use between with pre- and post-cure.

In still another embodiment, a number of layers or coats of multi-wall carbon nanotubes (MWCNTs) can be sprayed onto a polyether ether ketone (PEEK) film to form a carbon nanotube structured layer 58. FIG. 7 shows the sheet resistance ($\Omega/\square$) versus the number of spray coated layers of MWCNTs, as well as the thickness (micrometers ($\mu m$)) for those spray coated layers. As shown, the sheet resistance is at least about 15$\Omega/\square$, at least about 20$\Omega/\square$, at least about 25$\Omega/\square$, at least about 30$\Omega/\square$, at least about 35$\Omega/\square$, at least about 40$\Omega/\square$, at least about 45$\Omega/\square$, at least about 50$\Omega/\square$, at least about 55$\Omega/\square$, at least about 60$\Omega/\square$, at least about 65$\Omega/\square$, at least about 70$\Omega/\square$, at least about 75$\Omega/\square$, at least about 80$\Omega/\square$, at least about 90$\Omega/\square$, at least about 100$\Omega/\square$, at least about 110$\Omega/\square$, at least about 120$\Omega/\square$, at least about 130$\Omega/\square$, at least about 140$\Omega/\square$, at least about 150$\Omega/\square$, at least about 160$\Omega/\square$, at least about 170$\Omega/\square$, at least about 180$\Omega/\square$, at least about 190$\Omega/\square$, at least about 200$\Omega/\square$, at least about 220$\Omega/\square$, at least about 250$\Omega/\square$, at least about 275$\Omega/\square$, at least about 300$\Omega/\square$, at least about 325$\Omega/\square$, at least about 350$\Omega/\square$, at least about 375$\Omega/\square$, at least about 380$\Omega/\square$, or at least about 390$\Omega/\square$. A useful sheet resistance can be selected from any value between and inclusive of about 15 to about 400$\Omega/\square$. Non-limiting examples of sheet resistances can include about 15 $\Omega/\square$, 24 $\Omega/\square$, 37 $\Omega/\square$, 59 $\Omega/\square$, 78 $\Omega/\square$, 130 $\Omega/\square$, 200$\Omega/\square$, and 390$\Omega/\square$. The useful range of spray coated layers can be selected from any value between and inclusive of 2 to 30, the corresponding thicknesses ranging from about 0.4 to about 11 micrometers ($\mu m$). Non-limiting examples of the number of spray coated layers include 2, 4, 6, 8, 10, 15, 20, and 30, the corresponding the spray coated layer thicknesses including about 0.4 $\mu m$, 0.8 $\mu m$, 1.3 $\mu m$, 2.1 $\mu m$, 2.8 $\mu m$, 4.5 $\mu m$, 6.9 $\mu m$, and 10.8 $\mu m$, respectively.

In yet another embodiment, a number of layers or coats of multi-wall carbon nanotubes (MWCNTs) can be sprayed onto a preexisting composite tool to form a heating element in accordance with principles of the present invention, thereby modifying and/or adapted the tool to include heating for forming, debulking, and/or curing prepreg materials as described herein.

Again, referring to FIG. 4, and in still another embodiment, the heating element 56, the CNT structured layer 58 including a resin containing a curing agent, can be laminated onto a preexisting composite tool, thereby modifying and/or adapted the tool to include heating for forming, debulking, and/or curing prepreg materials.

Summarizing, in the various embodiments described herein, the resistivity of the at least one heating element 56 is in the range of 0.25-100 ohms per square (Ω/☐) prior to curing and in the range of 0.75-300 ohms per square (Ω/☐) after curing. Moreover, in contemplating available line voltages and power supplies, it has been determined that realizing a sheet resistance in the range of about 20-90 ohms per square (Ω/☐) after curing can be preferred in making use of those available line voltages and/or power supplies.

Still referring to FIG. 4, as the base structure 12 can be constructed from carbon fiber/epoxy in one embodiment, and carbon fiber can be electrically conductive, a first isolation ply 54 is further included. The first isolation ply 54 is disposed between the base structure 52 and the at least one heating element 56 and forms an electrical insulating gap between the base structure 52 and the at least one heating element 56. The first isolation ply 54 prevents, for example, a carbon fiber base structure from "shorting-out" or, more likely, forming a resistance in parallel with the resistance provide by the carbon nanotube structured layer 58. The same is true for other electrically conductive base structure materials as well. Thus, a person of ordinary skill in the art will appreciate that the inclusion of the first isolation ply 54 makes the performance of the present invention more predictable—it being based solely on the resistance of the carbon nanotube structured layer 58, and moreover, results in a heating element 56 that is physically proximate the worksurface 18.

In another embodiment, also having an electrically conductive base structure and including a plurality of heating elements as will described hereinafter, the first isolation ply 54 prevents the heating elements from electrically interacting with one another. A person of ordinary skill in the art will further appreciate that the inclusion of the first isolation ply 54 again, makes the performance of the present invention more predictable—it being based solely on the relative resistances of the carbon nanotube structured layers in each heating element, rather than the resistance of a network comprised of the resistances of the carbon nanotube structured layers in each heating element, as well as preventing the interaction of various power supplies connected to the heating elements.

In one embodiment, the first isolation ply 54 can also form a thermal insulating gap so that the heat passing from the at least one heating element 56 to the base structure 52 is reduced and/or minimized.

The composite build structure 14 can further include a facesheet 76 and a second isolation ply 78. As shown, the facesheet 76 has an upper surface 80, i.e., the worksurface 18, and a lower surface 82, the upper surface 80 or the worksurface 18 configured to receive the prepreg materials 16, as shown in FIGS. 1-3. As also shown in FIG. 4, the second isolation ply 78 has a top surface 84.

In one embodiment, the facesheet 76 comprises Invar®, known generically as FeNi36 or 64FeNi in the United States. In another embodiment, the facesheet 76 comprises a carbon fiber surfacing ply including a resin and a curing agent. In yet another embodiment, the facesheet 76 comprises nickel deposited using nickel vapor deposition (NVD). A person of ordinary skill in the art will appreciate that all of these materials are similar in that they all have a CTE similar to that of and/or "matched" to carbon fiber and can be selected to minimize differences in CTE between the heated composite tool 10 and a part constructed using carbon fiber, for example, the wing skin 12.

As further shown, the second isolation ply 78 is disposed between a top surface 90 of the CNT structured layer 58 and the lower surface 82 of the facesheet 76, forming an electrical insulating gap therebetween. Again, in an embodiment wherein the facesheet 76 is constructed of a material that is electrically conductive, for example, Invar®, carbon fiber, or nickel, the second isolation ply 78 prevents the facesheet 76 from "shorting-out" or forming a resistance in parallel with the resistance provide by the carbon nanotube structured layer 58. In this regard, the second isolation ply 78 functions much like the first isolation ply 54.

Continuing with the description of the first and the second isolation plies 54, 78, the first and the second isolation plies 54, 78 can, in one embodiment, be pre-impregnated with a resin, e.g., epoxy, containing a curing agent as will be described in more detail hereinafter. In another embodiment of the present invention, the first and the second isolation plies 54, 78, respectively, can be fiberglass plies.

Referring to FIG. 5, an exemplary electrical terminal 92 in accordance with principles of the present invention is shown. The electrical terminal 92 is preferably located in the worksurface margin 42, for example, along section line 6-6 at reference numeral 98, as shown in FIG. 1. In other embodiments, the electrical terminal can be located elsewhere as required or desired, further defining the current path $I_{59}$.

As shown in FIG. 5, the electrical terminal 92 comprises at least one or a first electrode 94, a threaded fastener 100 (not shown in cross section), an insulating washer 108, and a nut 106 (also not shown in cross section). The insulating washer 108 and the nut 106 are sized to the threaded fastener 100. The electrical terminal 92 further comprises a second electrode 96.

In one embodiment, the first and the second electrodes 94, 96 are a metal foil comprising Invar®. In another embodiment, the first and the second electrodes 94, 96 are a metal foil comprising titanium. Invar® and titanium both have a CTE similar to that of carbon fiber and can be selected to minimize a difference in CTE between a part being made using carbon fiber, e.g., wing skin 12, and the heated composite tool 10. Again, the matching of the CTE of tool to the part being produced using the tool, works to ensure dimensional accuracy in the part.

The threaded fastener 100 includes a head 102 and a threaded shaft 104. The head 102 can be any one of a number of different types, such as, for example, flat, rounded, socket, hex, etc., although a flat head with a taper, e.g., about 90 degrees or more, can be selected in one embodiment to maximize the contact area between the fastener 100 and, the electrode 94 and the carbon nanotube structured layer 58, as generally indicated a reference numerals 112 and 114, respectively, thereby reducing the contact resistance. A person of ordinary skill in the art will appreciate that any efforts to reduce contact resistance is particularly beneficial in low resistance, i.e., low sheet resistance, and/or high current applications of the present invention.

A flat head 102 can also be advantageous in providing a generally smooth or flat worksurface 18 so as to not catch or snag any preg materials 16 as they are maneuvered into position and laid-up on the heated composite tool 10. In one embodiment, a non-conductive filler material 118 can also be included to fill in a relief hole or aperture 116 defined by an upper and a lower rim 122, 124, respectively, and a wall 120 in the facesheet 76 for threaded fastener 100 should a completely smooth, void-free worksurface 18 be desired. Generally, such a non-conductive filler material 118 may not be necessary as the electrical terminal 92 is preferably located in the worksurface margin 42. However, filling the relief hole or aperture 116 in the facesheet 76 can be useful in preventing the accumulation of foreign object debris (FOD) in the relief hole or aperture 116, which can be detrimental in producing high-performance aerospace parts.

The head 102 can also be configured for any one of a number of different screw drive types as desired, such as, for example, from slotted, cruciform, internal polygon, hexalobar, three-pointed, and special types, including the most commonly known bit types, such as slotted, Phillips, Allen, hex, Torx, etc., without departing from the spirit of the present invention, and as will be appreciated by a person of ordinary skill in the art. Likewise, the threaded shaft 104 can be in accordance with any one of the many standard thread systems, e.g., American National Standards Institute (ANSI), American Society of Mechanical Engineers (ASME), SAE International (SAE), International Organization for Standardization (ISO), Deutsches Institut für Normung, etc., as desired, without departing from the spirit of the present invention, although in one embodiment, a finer thread or a smaller thread pitch can be preferred for maintaining tightness thereby ensuring lower contact resistance.

In one embodiment, the insulating washer 108 can be a ceramic shoulder washer, as shown in FIG. 5. A ceramic material is generally selected for heat tolerance, while a shoulder type washer is selected for ease of use in centering and insulating the fastener 100 from the base structure 52 or for preventing the threaded fastener 100 from making electrical contact with the base structure 52. However, a person of ordinary skill in the art will appreciate that other types of insulating washers and/or sleeves can be made from other materials and used for electrical isolation in like manner without departing from the spirit of the present invention.

In one embodiment, the nut 106 can be a hex nut, as shown in FIG. 5. However, similarly, other types of nuts, such as, for example, square nuts, etc., can be used in the alternative, without departing from the spirit of the present invention.

In one embodiment, the threaded fastener 100 and the nut 106 comprise Invar®. In another embodiment, the threaded fastener 100 and the nut 106 comprise titanium. Fasteners that are used in the heating element 56 to make the electrical connections to the carbon nanotube structure layer are preferably selected for low thermal expansion or contraction with changes in temperature. This selection prevents or minimizes delamination of the surrounding carbon fiber composite structure, any fiberglass isolation plies 54, 78, and any optional carbon fiber or other surfacing plies. Again, Invar® and titanium both have a CTE similar, i.e., matched, to that of carbon fiber and are selected to minimize differences in CTE between a part being made using carbon fiber, e.g., wing skin 12, and the heated composite tool 10, for example.

In assembly, the threaded shaft 104 of the threaded fastener 100 passes through the facesheet 76 having a relief hole or aperture 116, the head 102 resting against and coming into electrical contact with the first and the second electrodes 94, 96 and the carbon nanotube structured layer 58. It will be appreciated that the direct physical and electrical contact between the head 102 of the threaded fastener 100 and the carbon nanotube structured layer 58 can be somewhat tenuous in nature, the threaded fastener 100 being very hard and durable, and the carbon nanotube structured layer 58 being comparably soft and fragile, as well as very thin as described hereinabove, potentially resulting in a less than desirable electrical contact, e.g., non-robust and/or high resistance. Thus, the first and the second electrodes 94, 96 are included in the electrical terminal 92 for purposes of durability and robustness and spreading the clamping force between the head 102 of the threaded fastener 100 and the nut 106 across a larger portion of the carbon nanotube structured layer 58, thereby providing good electrical contact between the carbon nanotube structured layer 58 and the threaded fastener 100 and the nut 106. In one embodiment, a conductive paste or adhesive can be placed between the first and second electrodes 94, 96 and the carbon nanotube structured layer 58 to enhance the electrical contact and/or aid in locating the electrodes relative to the carbon nanotube structured layer 58 in assembly as will be further described hereinafter. It will be understood that the first and the second electrodes 94, 96 extend along a periphery or edge of the carbon nanotube structured layer 58, as will also described in more detail hereinafter.

Continuing, the threaded shaft 104 of the threaded fastener 100 is inserted and passes through corresponding holes in the first electrode 94, the carbon nanotube structured layer 58, the second electrode 96, and the base structure 52. In one embodiment, the holes can be countersunk-drilled after layup of the first electrode 94, the carbon nanotube structured layer 58, the second electrode 96, and the base structure 52. In another embodiment, wherein the first and the second electrodes 94, 96 comprise Invar® or titanium, the holes in the first and the second electrodes 94, 96 can be drilled prior to lay-up or "pre-drilled," as drilling through Invar® and titanium can be somewhat difficult requiring special drill bits, and to avoid generating undesired heat. The insulating washer 108 is then placed over the threaded shaft 104 of the threaded fastener 100, against the base structure 52, preventing the threaded fastener 100 from making electrical contact with the base structure 52, thereby insulating the threaded fastener 100 from the base structure 52. The nut 104 is then placed on the threaded shaft 104 of the threaded fastener 100 and tightened against the insulating washer 108, the threaded fastener 100 and the nut 106 sandwiching the carbon nanotube structured layer 58 between the first electrode 94 and the base structure 52 and/or between the first and the second electrodes 94, 96.

As also shown in FIG. 5, a die crimp 110 can be place on the threated shaft 104 of the threaded fastener 100 for purposes of attaching the wire 72 for connecting to a power source prior to placement of the nut 106. Crimped electrical connections are preferred in one embodiment for providing a low resistance connection to the threaded fastener 100 thereby extending the current path $I_{59}$ defined by the carbon nanotube structured layer 58. In other embodiments, the wire 72 can be directly attached to the threaded fastener 100 or an arrangement of stacked nuts can be used for attaching the die crimp 110 to the threaded fastener 100.

In still other embodiments, the electrical connections to the carbon nanotube structured layer 58 and/or electrodes can be made by a crimp connector, i.e., crimping, an electrically conductive adhesive, an electrically conductive paste, a pressure fitting, or a clamp should the carbon nanotube structured layer 58 and/or electrodes be available, i.e., exposed, at the edge or periphery of the heated composite tool 10 for doing so.

Constructions of Heated Composite Tools

Referring to FIGS. 1-5 and in one embodiment, a method of constructing a heated composite tool 10, includes the steps of placing a first isolation ply 54 pre-impregnated with a resin, the resin including a curing agent, over a base structure 52 formable into a shape of a composite part that is to be produced, placing a carbon nanotube structured layer 60 over the first isolation ply 54 to define a first current path, placing first electrodes, e.g., the electrode 94, on the carbon nanotube structured layer 54 in first and second electric terminal locations, e.g., at the first and the second ends 64, 66, to define a first end and a second end of the first current path, and placing a second isolation ply 78 pre-impregnated with a resin, the resin including a curing agent, over the carbon nanotube structured layer 58 and the electrodes, and curing the first and the second isolation plies 54, 78. In another embodiment, the method further includes placing second electrodes, e.g., the electrode 96, on the first isolation ply 54 in the first and the second electric terminal locations, e.g., at the first and the second end 64, 66, prior to placing the carbon nanotube structured layer 58. In this embodiment, the first and the second electrodes, e.g., the first and the second electrodes 94, 96, sandwich respective portions of the carbon nanotube structured layer 54 in the first and the second terminal locations, e.g., at the second ends 66.

In another embodiment, the carbon nanotube structured layer 54 is pre-impregnated with a resin, the resin including a curing agent. In this embodiment, the carbon nanotube structured layer 54 is cured along with the first and the second isolation plies 54, 78.

In another embodiment, the first and the second isolation plies 54, 78 and/or the carbon nanotube structured layer 54 can be cured along with the materials forming the composite based structure 52, such as, for example, in the construction of a newly constructed heated composite tool. In another still embodiment, the first and the second isolation plies 54, 78 and/or the carbon nanotube structured layer 54 are applied or laid up on a preexisting tool and then bagged and cured to modified and/or adapted the pre-existing tool to include heating for forming, debulking, and/or curing prepreg materials in accordance with principles of the present invention.

Scalability of the Present Invention

Figure 9:
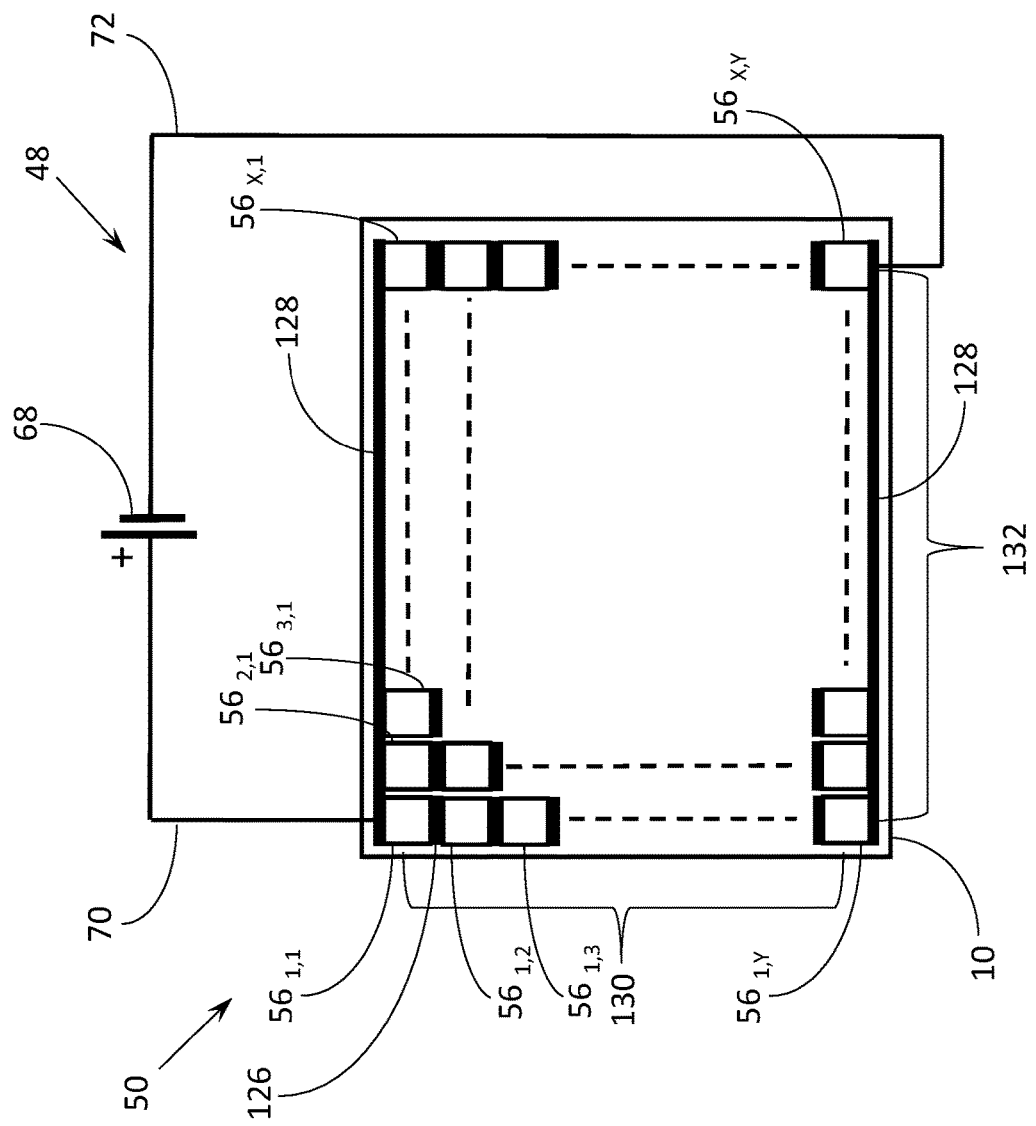
FIG. 9 is a schematic diagram of a heating structure having a plurality of heating elements.

Referring now to FIG. 9, the scalability of the heating structure 50 will be discussed. A person of ordinary skill in the art will appreciate that composite parts can be so large that it is impractical or impossible to move them laid up on their accompanying tool into a suitably-sized autoclave for debulking and/or curing; for example, the wing of a large passenger airplane. Moreover, it can be difficult or impractical to produce a single heating element large enough for the tool used to produce such parts. However, the present invention provides a heated composite tool useful for forming, debulking, and/or curing prepreg materials in building such large parts through combining multiple heating elements as will be described below.

In accordance with another aspect of the present invention and as shown in FIG. 9, a plurality of heating elements $56_{X,Y}$ can be electrically and thermally combined to realize a heated composite tool 10 that is physically larger than that typically afforded by a single heating element 56. As shown, a plurality of heating elements $56_{X,Y}$ are arranged in close physical proximity with one another, side-by-side, end-to-end, etc., in a planar arrangement. More specifically, physically adjacent, i.e., not overlapped, side-by-side, end-to-end, heating elements 56 can be electrically connected together to increase the physical, planar size of the heated composite tool 10. For example, heating elements $56_{1,1}$ and $56_{1,2}$, are electrically connected in series, the carbon nanotube structured layers of each heating element electrically coupled together through a terminal 126.

Similarly, heating elements $56_{1,1}$ and $56_{2,1}$, are electrically connected in parallel, the carbon nanotube structured layers of each heating element likewise electrically coupled together through a terminal 128. It has been found that there is minimal temperature variation across the terminals 126, 128, and that a heated composite tool 10 that is physically larger than that afford by any of the heating elements alone, e.g., $56_{1,1}$, $56_{1,2}$ or $56_{2,1}$, can be realized.

Those of ordinary skill in the art will appreciate that although the heating elements $56_{X,Y}$ in FIG. 9 are shown as a matrix, the heating elements $56_{X,Y}$ are, in fact, electrically connected in a series-parallel circuit arrangement, the series heating elements designed by the variable "Y" as referenced by numeral 130 and the parallel heating elements designed by the variable "X" as referenced by numeral 132, the placement of each respective heating element designated as $56_{X,Y}$. In some embodiments of the present invention, the series-parallel arrangement can be used to create "zones" in the heated composite tool 10, each having different power densities and producing different amounts of heat to be applied to the laminate, as can be required by the complex shape of a mold tool, the mold tool acting as a heatsink with a varying heat profile.

Those of ordinary skill in the art will also appreciate that the electrical load, in terms of voltage and current, of the heating structure 50 can be varied, as desired, in accordance with the electrical circuit arrangement, i.e., series-parallel combinations, of the plurality of heating elements $56_{X,Y}$. The plurality of heating elements $56_{X,Y}$, incorporated or built into the heated composite tool 10, are electrically connected or coupled to an electromotive force 68 via electrical terminals 128, such as through wires 70, 72, forming an electrical circuit 48. The plurality of heating elements $56_{X,Y}$, electrically connected in series, parallel, and/or a series-parallel combination, are responsive to the electromotive force 68, producing heat in response thereto. Further, by varying, adjusting, or setting, i.e., selecting, the voltage potential provided by the electromotive force 68, the heat produced by the heated composite tool 10 can be varied proportionally.

Figure 10:
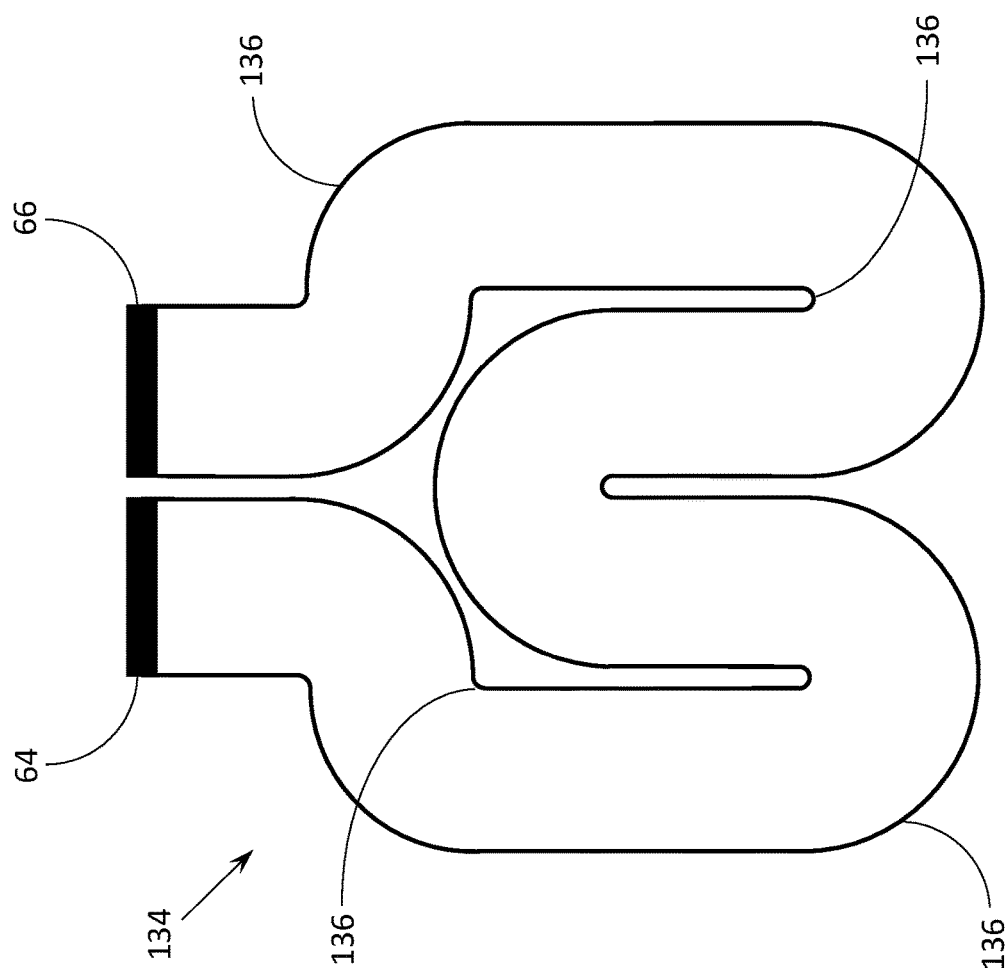
FIG. 10 is a diagram illustrating a carbon nanotube (CNT) structured layer defining a current path having a serpentine configuration with rounded corners.
Figure 11:
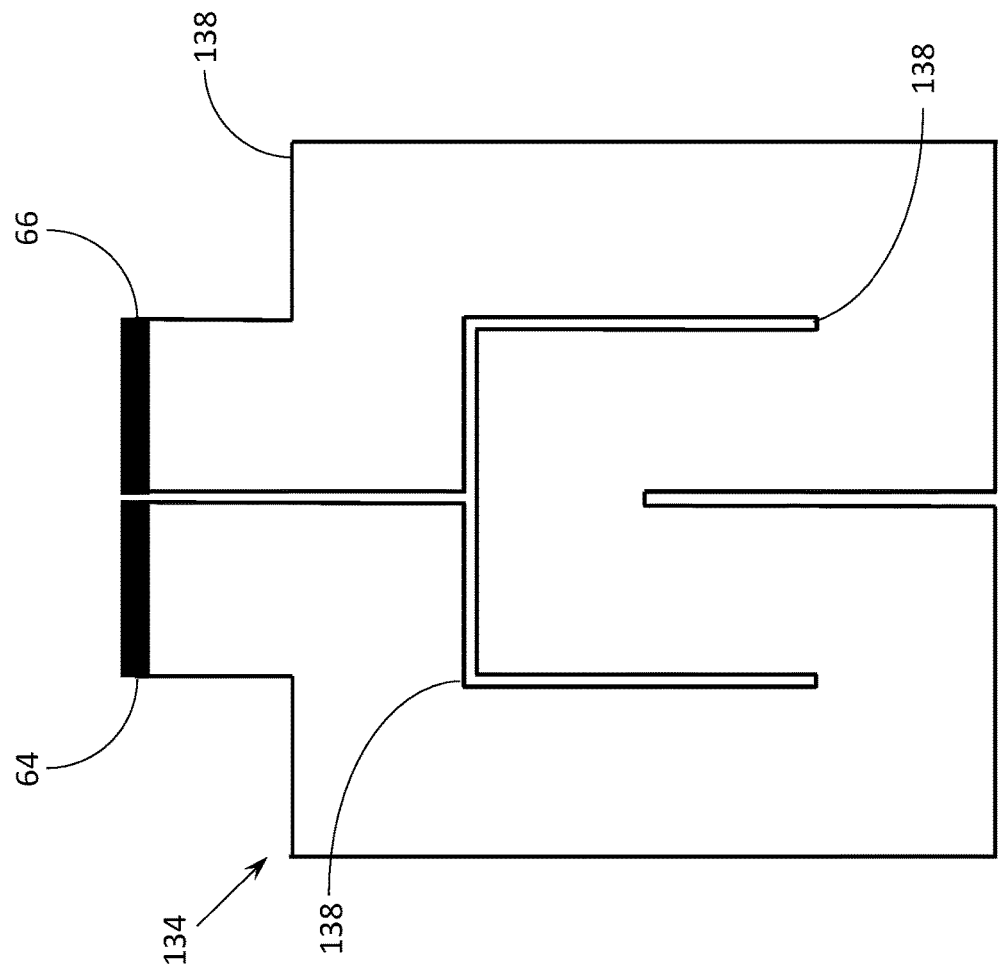
FIG. 11 is a diagram illustrating a CNT structured layer defining a current path having a serpentine configuration with square corners.

With reference to FIGS. 4, 10, and 11, the carbon nanotube structured layer 58 can also be designed, manufactured, and/or constructed such that the electrical pathway defined by the carbon nanotube structured layer 58 is in a serpentine configuration 134. The serpentine configuration 134 allows for the first and the second terminals 64, 66 to be co-located, i.e., located in close proximity to one another or next to each other, to promote easy electrical connections thereto with good cable management. For example, the carbon nanotube structured layer 58 can be cut with a punch, a laser cutter, or by other means to form the serpentine configuration 134. FIGS. 10 and 11 show examples of serpentine configurations 134 with round corners 136 and square corners 138, respectively.

Figure 12:
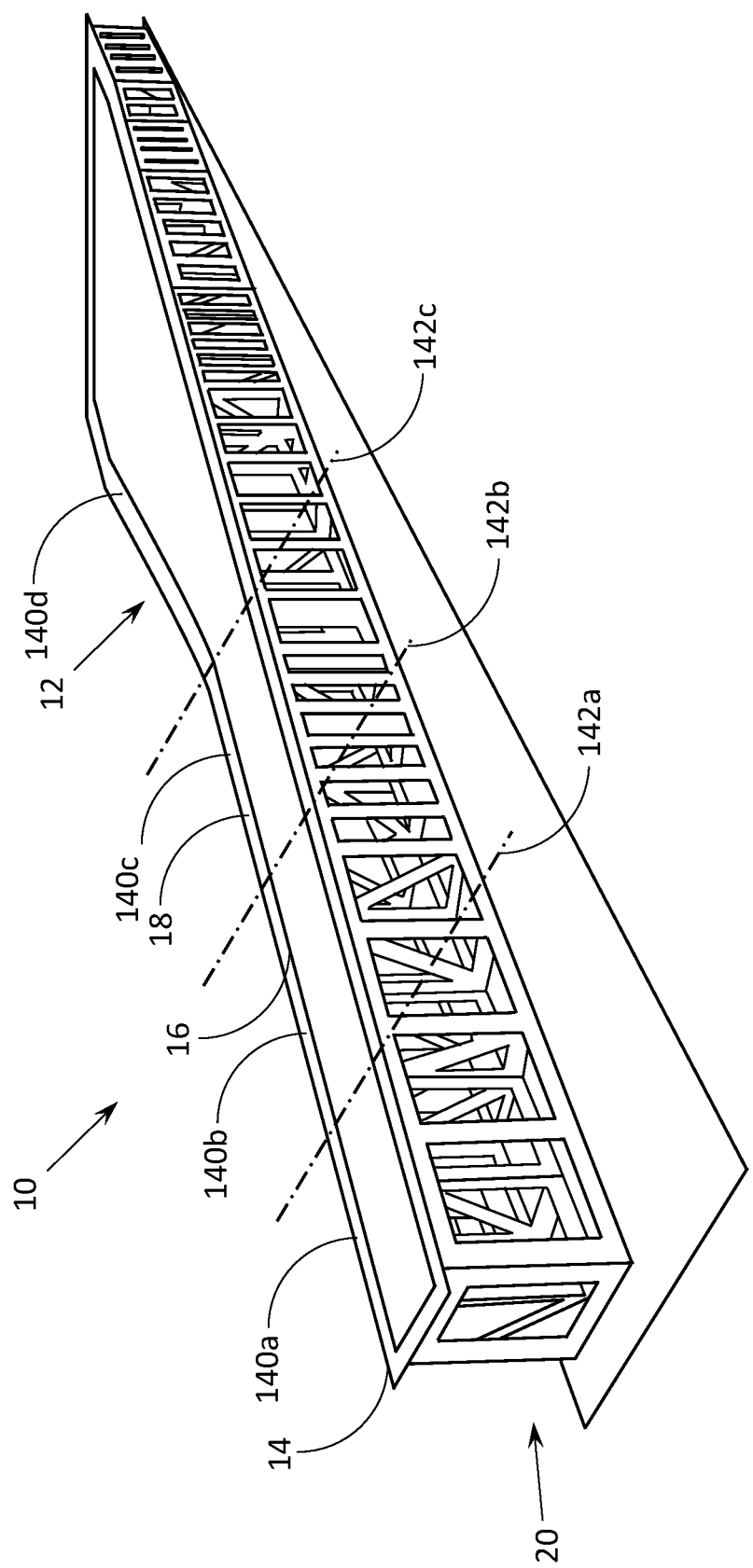
FIG. 12 is a perspective view of a heated composite tool of the present invention with a plurality of heat zones.

Referring now to FIG. 12, a perspective view of a heated composite tool 10 of the present invention is shown including a plurality of heat zones is 140a-d. Each heat zone 140a-d is defined by one or more different or grouped heating elements arranged across the composite build structure 14 and/or worksurface 18. The separation or demarcation of those heating elements in the heat zones 140a-d are generally indicated by dashed lines 142a-c.

In one embodiment, the wing skin 12 can be thicker, e.g., have more layers, in heat zones 140a-c and thinner in heat zone 140d, e.g., fewer layers, requiring more heat in heat zones 140a-c than in heat zone 140d, for example. To this end, and in one embodiment, more power can be applied to those heating elements in heat zones 140a-c than those heating elements in heat zone 140d. Alternatively, and in another embodiment, those heating elements in heat zones 140a-c can be built to have a different sheet resistance to those heating elements in heat zone 140d.

A person of ordinary skill in the art will be able to adjust the power and/or the sheet resistance as desire to compensate to address, i.e., tailor the present invention, to parts having different heat requirements in different areas. Moreover, the present invention is not tied to any particular number or type of heat zones but rather, applies equally well to any number of heat zones having any temperature range as required by a part.

While various embodiments of a heated composite tool have been illustrated by the foregoing drawings and have been described in considerable detail, it is not intended to restrict or in any way limit the scope of the appended claims to such detail. Additional advantages and modifications will become readily apparent to a person of ordinary skill in the art.

What is claimed is:

1. A heated composite tool, useful for forming, debulking, and/or curing prepreg materials, comprising:
   a composite build structure having a shape of a composite part that is to be produced, configured to receive and support the prepreg materials during lay-up, and comprising:
      a base structure having holes;
      a heating structure physically coupled to the base structure, and including:
         at least one heating element, comprising:
            a carbon nanotube structured layer defining a current path having a first end and a second end, and having holes that correspond with the holes of the base structure; and
            a first electrical terminal electrically coupled to the first end and a second electrical terminal electrically coupled to the second end, wherein at least one of the first and the second electrical terminals comprises:
               at least one electrode having a corresponding hole to the corresponding holes in the carbon nanotube structured layer and the base structure, and in electrical contact with and placed against the carbon nanotube structured layer;
               a threaded fastener having a head and a threaded shaft, the threaded shaft inserted and passing through the corresponding holes in the at least one electrode, the carbon nanotube structured layer, and the base structure;
               an insulating washer sized to the threaded fastener and placed over the threaded shaft of the threaded fastener and against the base structure, the insulating washer preventing the threaded fastener from making electrical contact with the base structure; and
               a nut sized to the threaded fastener and placed on the threaded shaft of the threaded fastener, and tightened against the insulating washer, the threaded fastener and the nut sandwiching the at least one electrode and the carbon nanotube structured layer together,
            wherein the threaded fastener extends the current path, and
            wherein the at least one electrode, the threaded fastener, and the nut comprise at least one of FeNi36 and titanium, having a coefficient of thermal expansion matched to that of carbon fiber; and
         a first isolation ply disposed between the base structure and the at least one heating element, the first isolation ply forming an electrical insulating gap between the base structure and the at least one heating element,
   wherein the carbon nanotube structured layer is responsive to an electromotive force applied across the first and the second electrical terminals to heat the tool.

2. The heated composite tool of claim 1, the base structure comprising at least one of carbon fiber including a resin and a curing agent, a carbon foam core and one or more carbon fiber laminates including a resin and a curing agent, and a machined carbon fiber/bismaleimide (BMI) composite tooling material including a resin and a curing agent.

3. The heated composite tool of claim 1, the composite build structure further comprising a facesheet having an upper surface and a lower surface, the upper surface configured to receive the prepreg materials;
   the carbon nanotube structured layer having a top surface;
   the composite build structure further comprising a second isolation ply, the second isolation ply forming an electrical insulating gap between the top surface of the carbon nanotube structured layer and the lower surface of the facesheet.

4. The heated composite tool of claim 3, wherein the facesheet follows the shape of the composite part that is to be produced, the first and second isolation plies pre-impregnated with a resin, the resin including a curing agent, and the first and second isolation plies cured so that the heating structure also follows and maintains the shape of the composite part that is to be produced.

5. The heated composite tool of claim 1, the carbon nanotube structured layer pre-impregnated with a resin including a curing agent, wherein the resistivity of the at least one heating element is in the range of 0.25-100 ohms per square ($\Omega/\square$) prior to curing and in the range of 0.75-300 ohms per square ($\Omega/\square$) after curing.

6. The heated composite tool of claim 3, wherein at least one of the first isolation ply and the second isolation ply comprises fiberglass.

7. The heated composite tool of claim 3, the facesheet comprising at least one of FeNi36, a carbon fiber surfacing ply including a resin and a curing agent, and nickel deposited using nickel vapor deposition (NVD).

8. The heated composite tool of claim 1, further comprising a plurality of heating elements each heating element defining a different heat zone across the composite build structure.

9. The heated composite tool of claim 1, wherein the response to an applied electromotive force results in a power density of 0.5-30 watts per square inch on a surface of the tool.

10. The heated composite tool of claim 1, wherein the carbon nanotube structured layer is a layer of single wall carbon nanotubes (SWCNTs).

11. The heated composite tool of claim 1, wherein the carbon nanotube structured layer and the electromotive force are selected to produce at least one of a tack temperature in the range of 100-150° F. with a tolerance of +/−10° F. debulking temperature in the range of 100-200° F. with a tolerance of +/−10° F., and a curing temperature in the range of 150-400° F. with a tolerance of +/−10° F.

12. The heated composite tool of claim 6, the carbon nanotube structured layer pre-impregnated with a resin including a curing agent, wherein the resistivity of the at least one heating element is in the range of 0.25-100 ohms per square ($\Omega/\square$) prior to curing and in the range of 0.75-300 ohms per square ($\Omega/\square$) after curing.

* * * * *